US012720263B2

(12) United States Patent
Roh et al.

(10) Patent No.: US 12,720,263 B2
(45) Date of Patent: Aug. 25, 2026

(54) VIBRATION APPARATUS AND APPARATUS INCLUDING THE SAME

(71) Applicant: LG Display Co., Ltd., Seoul (KR)

(72) Inventors: Eun Roh, Paju-si (KR); NohJin Myung, Paju-si (KR); SangWoo Jin, Paju-si (KR); Seunghyun Sung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 284 days.

(21) Appl. No.: 18/513,737

(22) Filed: Nov. 20, 2023

(65) Prior Publication Data

US 2024/0223964 A1 Jul. 4, 2024

(30) Foreign Application Priority Data

Dec. 30, 2022 (KR) ........................ 10-2022-0190399

(51) Int. Cl.

*H04R 17/10* (2006.01)
*H04R 1/02* (2006.01)
*H04R 7/10* (2006.01)

(52) U.S. Cl.

CPC ............. *H04R 17/10* (2013.01); *H04R 1/028* (2013.01); *H04R 7/10* (2013.01); *H04R 2307/023* (2013.01); *H04R 2499/15* (2013.01)

(58) Field of Classification Search

CPC .......... H04R 17/10; H04R 1/028; H04R 7/10; H04R 2307/023; H04R 2499/15; H04R 17/00; H04R 7/045; H04R 7/06; H04R 2307/025

See application file for complete search history.

(56) References Cited

U.S. PATENT DOCUMENTS

| | | | | |
|---|---|---|---|---|
| 2005/0147274 | A1* | 7/2005 | Azima | G06F 1/1688 381/431 |
| 2011/0064250 | A1* | 3/2011 | Jeong | H04R 17/00 29/25.35 |
| 2014/0319968 | A1* | 10/2014 | Sashida | H04R 17/00 310/332 |
| 2015/0153829 | A1* | 6/2015 | Shiraishi | G06F 3/016 345/173 |
| 2018/0202512 | A1* | 7/2018 | Koyama | G10H 3/143 |
| 2019/0324501 | A1* | 10/2019 | Kim | H04N 5/64 |
| 2020/0059733 | A1* | 2/2020 | Shin | H04R 17/00 |
| 2020/0059735 | A1* | 2/2020 | Kim | H04M 1/035 |
| 2020/0314515 | A1* | 10/2020 | Jang | H10K 59/8722 |
| 2021/0200265 | A1* | 7/2021 | Ko | B06B 1/0692 |

FOREIGN PATENT DOCUMENTS

| | | |
|---|---|---|
| KR | 10-2010-0073075 A | 7/2010 |
| KR | 10-1480937 B1 | 1/2015 |

* cited by examiner

*Primary Examiner* — Mark Fischer
(74) *Attorney, Agent, or Firm* — PnK IP LLC

(57) ABSTRACT

A vibration apparatus includes a vibration member, a cover member, and a vibration generating part between the vibration member and the cover member. At least a portion of vibration generating part is configured to be one body with or directly connected with the vibration member.

27 Claims, 16 Drawing Sheets

D-D'

| | 0°-90°-0° | 45°-(-45°)-45° |
|---|---|---|
| 10Hz |  |  |
| 11.66Hz |  |  |
| 21.55Hz |  |  |
| 36.884Hz |  |  |
| 100Hz |  |  |
| 1000Hz |  |  |

F

G

VIBRATION APPARATUS AND APPARATUS INCLUDING THE SAME

CROSS-REFERENCE TO RELATED APPLICATION

This application claims the priority of Korean Patent Application No. 10-2022-0190399 filed on Dec. 30, 2022, which is hereby incorporated by reference in its entirety.

BACKGROUND

Field of the Disclosure

The present disclosure relates to a vibration apparatus and an apparatus including the same.

DESCRIPTION OF THE BACKGROUND

Recently, the demands for slimming and thinning electronic devices are increasing. In speakers applied to electronic devices, piezoelectric devices capable of being implemented to have a thin thickness are attracting much attention instead of voice coils, based on the demands for slimness and thinness.

Examples of vibration apparatuses or speakers, to which a piezoelectric device is applied, include vibration apparatuses where the piezoelectric device is adhered to a metal vibration plate and film-type vibration apparatuses where electrodes are formed on and under a piezoelectric film material and a voltage is applied to the electrodes.

Vibration apparatuses, where a piezoelectric device is adhered to a metal vibration plate, is heavy in weight and film-type vibration apparatuses are degraded in sound quality because a heat-resistant temperature is low and a uniform vibration is not maintained, and due to this, it is required to develop vibration apparatuses where a uniform vibration is maintained and a weight is reduced.

SUMMARY

Accordingly, the present disclosure is directed to a vibration apparatus and an apparatus including the same that substantially obviates one or more of problems due to limitations and disadvantages described above.

More specifically, the present disclosure is to provide a vibration apparatus having a new structure and an apparatus including the vibration apparatus, in which a manufacturing process and a structure of the vibration apparatus are simplified.

The present disclosure is also to provide a vibration apparatus and an apparatus including the same, which may be lightweight in weight of the vibration apparatus, have a high heat deflection temperature, and maintain a uniform vibration.

Further, the present disclosure is to provide a vibration apparatus and an apparatus including the same, in which a sound pressure level characteristic of a sound may be enhanced.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a vibration apparatus includes a vibration member, a cover member, and a vibration generating part between the vibration member and the cover member. At least a portion of the vibration generating part is configured to be one body with or directly connected with the vibration member.

In another aspect of the present disclosure, an apparatus comprises a passive vibration member and a vibration generating apparatus connected with the passive vibration member to vibrate the passive vibration member. The vibration generating apparatus comprises the vibration apparatus comprising a vibration member, a cover member, and a vibration generating part between the vibration member and the cover member. At least portion of the vibration generating part is configured to be one body with or directly connected with the vibration member.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are exemplary and explanatory and are intended to provide further explanation of the disclosure as claimed.

According to an aspect of the present disclosure, a vibration apparatus and an apparatus including the same may be simplified in structure and manufacturing process.

In a vibration apparatus and an apparatus including the same according to an aspect of the present disclosure, a signal cable and the vibration apparatus may be provided as one body, and thus, may be configured as one part.

According to an aspect of the present disclosure, a vibration apparatus and an apparatus including the same may have a high heat deflection temperature and may maintain a uniform vibration.

According to an aspect of the present disclosure, a vibration apparatus and an apparatus including the same may be enhanced in sound pressure level characteristic of a sound.

In a vibration apparatus and an apparatus including the same according to an aspect of the present disclosure, a thickness of the vibration apparatus may be reduced, and thus, a weight of the vibration apparatus may be reduced, thereby implementing a lightweight vibration apparatus.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this disclosure, illustrate aspects of the disclosure and together with the description serve to explain principles of the disclosure.

In the drawings.

Figure 1:
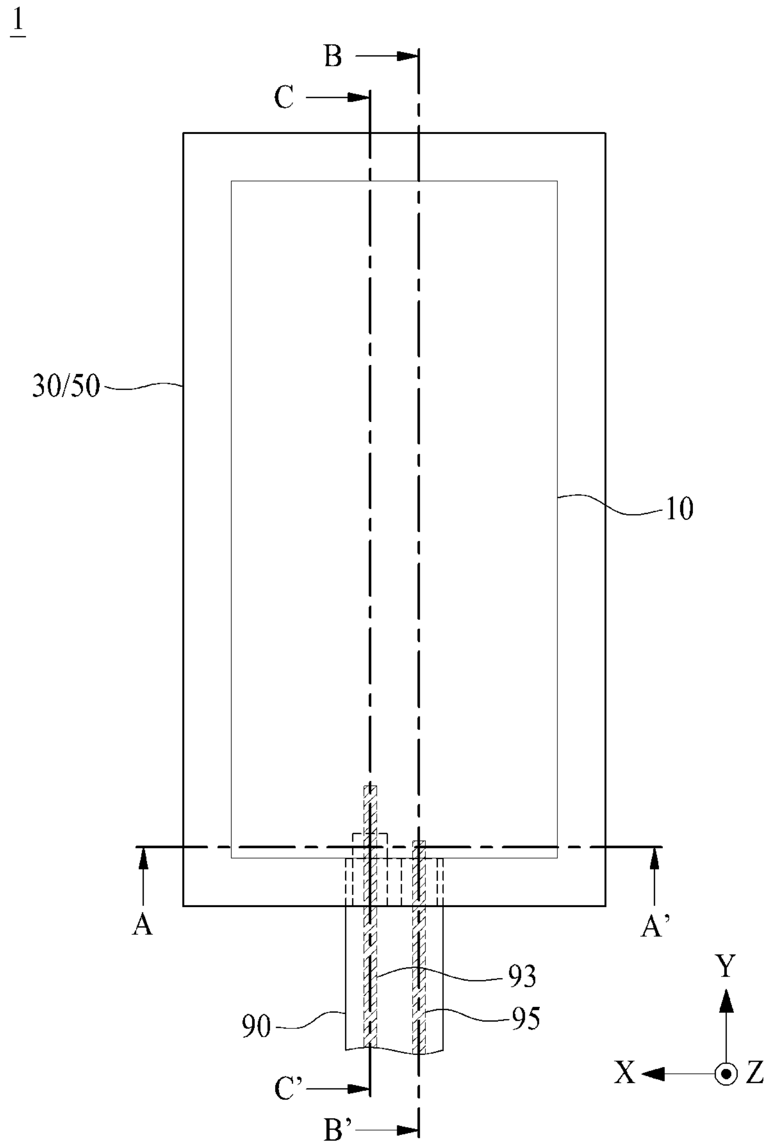
FIG. 1 illustrates a vibration apparatus according to an aspect of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof may be exaggerated for clarity, illustration, and/or convenience.

DETAILED DESCRIPTION

Reference is now be made in detail to aspects of the present disclosure, examples of which may be illustrated in the accompanying drawings. In the following description, when a detailed description of well-known functions, structures or configurations may unnecessarily obscure aspects of the present disclosure, the detailed description thereof may have been omitted for brevity. Further, repetitive descriptions can be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Furthermore, the present disclosure is only defined by scopes of claims.

Shapes (e.g., sizes, lengths, widths, heights, thicknesses, locations, radii, diameters, and areas), ratios, angles, numbers, and the like disclosed herein, including those illustrated in the drawings are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

When the term "comprise," "have," "include," "contain," "constitute," "make of," "formed of," or the like is used with respect to one or more elements, one or more other elements may be added unless a term such as "only" or the like is used. The terms used in the present disclosure are merely used to describe example aspects, and are not intended to limit the scope of the present disclosure. The terms of a singular form may include plural forms unless the context clearly indicates otherwise.

The word "exemplary" is used to mean serving as an example or illustration. Aspects are example aspects. "Embodiments," "examples," "aspects," and the like should not be construed as preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e. g., a level, range, dimension, size, or the like) is construed to include an error or tolerance range even where no explicit description of such an error or tolerance range is provided. An error or tolerance range may be caused by various factors (e. g., process factors, internal or external impact, noise, or the like). In interpreting a numerical value, the value is interpreted as including an error range unless explicitly stated otherwise.

In describing a positional relationship, where the positional relationship between two parts parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts may be located between the two parts unless a more limiting term, such as "immediate(ly)," "direct(ly)," or "close(ly)," is used. For example, when a structure is described as being positioned "on," "over," "under," "above," "below," "beneath," "near," "close to," "adjacent to," "besides," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first," "second," or the like may be used herein to describe various elements (e.g., layers, films, regions, components, sections, or the like), these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of elements.

For the expression that an element (e.g., layer, film, region, component, section, or the like) is "connected," "coupled," "adhered," or the like to another element, the element may not only be directly connected, coupled, adhered, or the like to another element, but also be indirectly connected, coupled, adhered, or the like to another element with one or more intervening elements disposed or interposed between the elements, unless otherwise specified.

For the expression that an element (e.g., layer, film, region, component, section, or the like) "contacts," "overlaps," or the like with another element, the element may not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other, and may be meant as lines or directions having wider directivities within the range within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item may represent (i) a combination of items provided by two or more of the first item, the second item, and the third item or (ii) only one of the first item, the second item, or the third item.

The expression of a first element, a second elements "and/of" a third element should be understood as one of the first, second and third elements or as any or all combinations of the first, second and third elements. By way of example, A, B and/or C may refer to only A; only B; only C; any of A, B, and C (e.g., A, B, or C); or some combination of A, B, and C (e.g., A and B; A and C; or B and C); or all of A, B, and C. Furthermore, an expression "A/B" may be understood as A and/or B. For example, an expression "A/B" can refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various aspects of the present disclosure may be partially or entirety coupled to or combined with each other, may be technically associated with each other, and may be variously inter-operated, linked or driven together. The aspects of the present disclosure may be implemented or carried out independently of each other or may be implemented or carried out together in co-dependent or related relationship. In one or more aspects, the components of each apparatus according to various aspects of the present disclosure are operatively coupled and configured.

Unless otherwise defined, the terms (including technical and scientific terms) used herein have the same meaning as commonly understood by one of ordinary skill in the art to which example aspects belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example aspects of the present disclosure are described in detail with reference to the accompanying drawings. With respect to reference numerals to elements of each of the drawings, although the same elements may be illustrated in other drawings, like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may differ from an actual scale, dimension, size, and thickness, and thus, aspects of the present disclosure are not limited to a scale, dimension, size, and thickness illustrated in the drawings.

Figure 2:
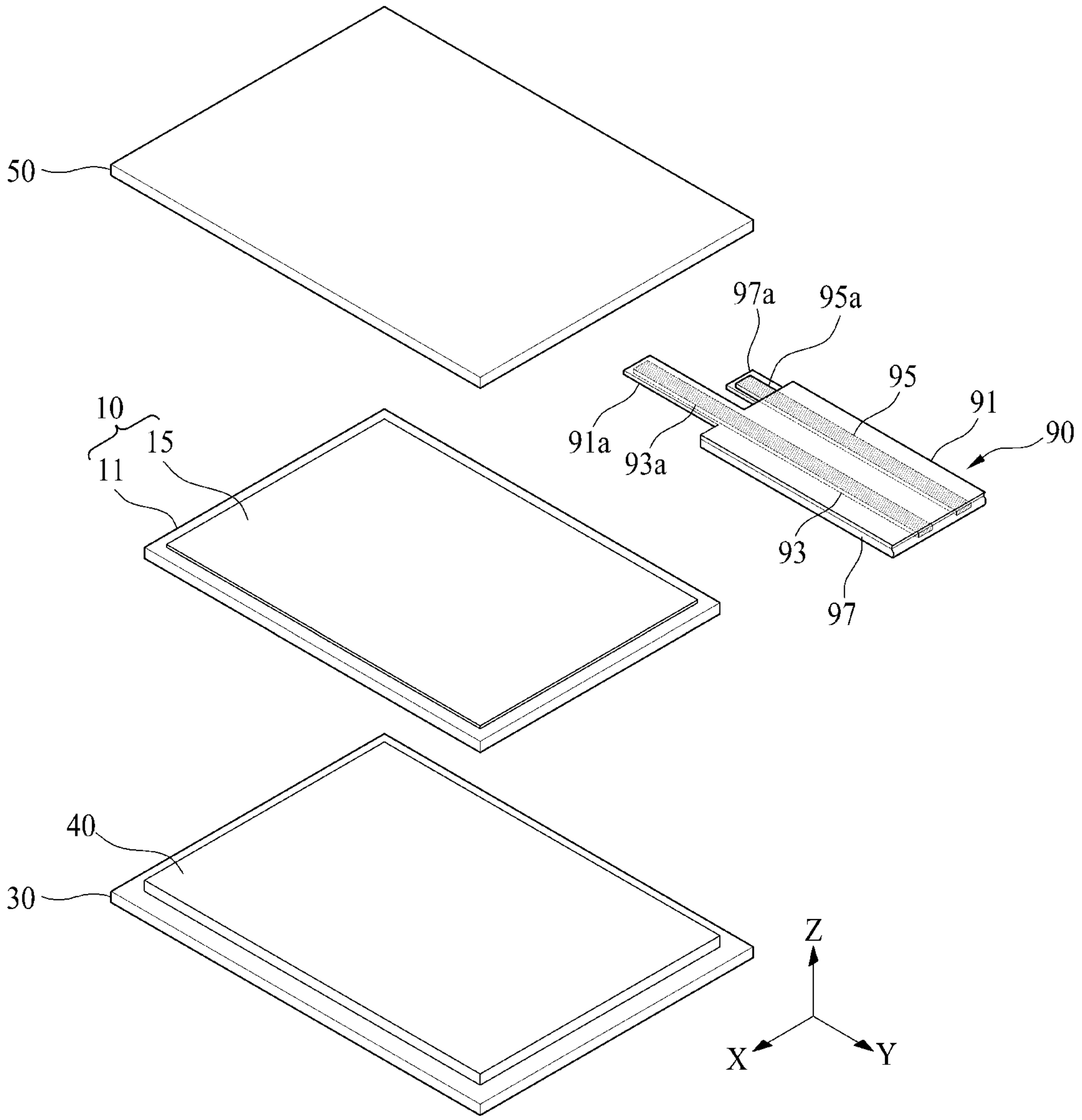
FIG. 2 is an exploded perspective view of the vibration apparatus illustrated in FIG. 1 according to an aspect of the present disclosure.
Figure 3:
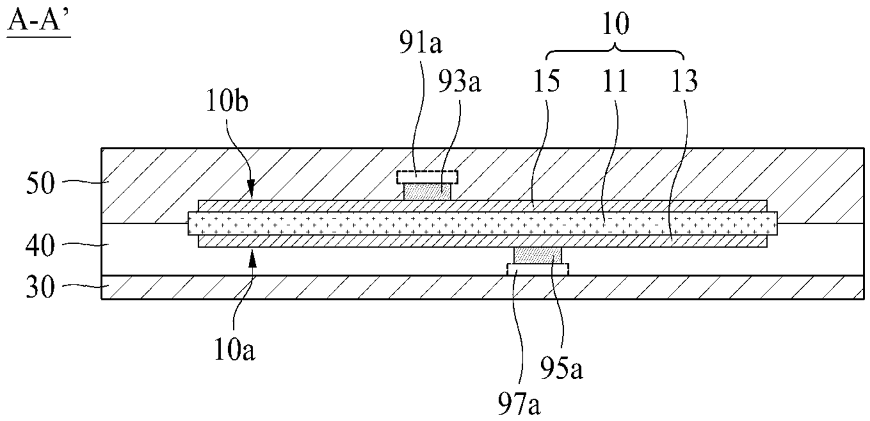
FIG. 3 is a cross-sectional view taken along line A-A' illustrated in FIG. 1 according to an aspect of the present disclosure.
Figure 4:
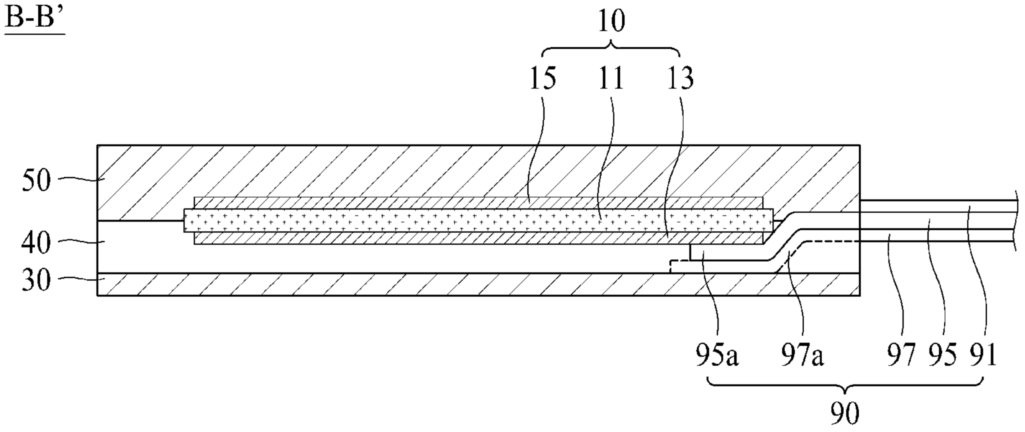
FIG. 4 is a cross-sectional view taken along line B-B' illustrated in FIG. 1 according to an aspect of the present disclosure.
Figure 5:
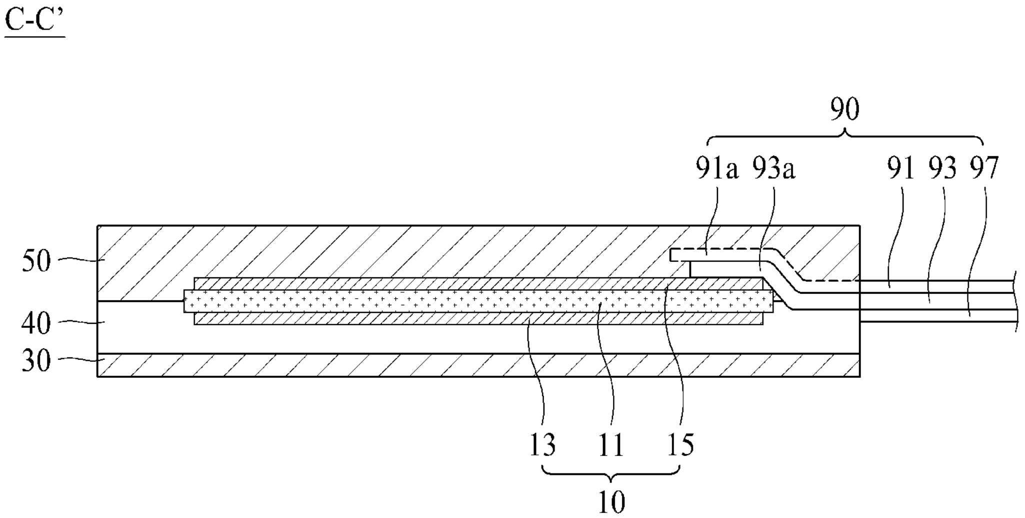
FIG. 5 is a cross-sectional view taken along line C-C' illustrated in FIG. 1 according to an aspect of the present disclosure.

FIG. 1 illustrates a vibration apparatus according to an aspect of the present disclosure. FIG. 2 is an exploded perspective view of the vibration apparatus illustrated in FIG. 1 according to an aspect of the present disclosure. FIG. 3 is a cross-sectional view taken along line A-A' illustrated in FIG. 1 according to an aspect of the present disclosure. FIG. 4 is a cross-sectional view taken along line B-B' illustrated in FIG. 1 according to an aspect of the present disclosure. FIG. 5 is a cross-sectional view taken along line C-C' illustrated in FIG. 1 according to an aspect of the present disclosure.

Referring to FIGS. 1 to 5, a vibration apparatus 1 according to an aspect of the present disclosure may include a vibration generating part 10, a cover member 30, a vibration member 50, and a signal cable 90.

The vibration generating part 10 may be configured to vibrate based on a driving signal (or a sound signal or a voice signal) supplied through the signal cable 90. For example, the vibration generating part 10 may include a first surface 10*a* and a second surface 10*b* opposite to the first surface 10*a*. In the vibration generating part 10, the first surface 10*a* may be a lower surface, a rear surface, a backside surface, a lowermost electrode layer, a lowermost electrode portion, or a lowermost electrode surface. The second surface 10*b* may be an upper surface, a front surface, an uppermost electrode layer, an uppermost electrode portion, or an uppermost electrode surface.

The vibration generating part 10 according to an aspect of the present disclosure may include one or more vibration portions. For example, the vibration generating part 10 according to an aspect of the present disclosure may include one vibration portion provided in a single-layer structure, but aspects of the present disclosure are not limited thereto. There "one or more vibration part" may be referred to as a "vibration part." The vibration generating part 10 may be a vibration portion, but aspects of the present disclosure are not limited thereto.

The vibration portion 10 may include a vibration layer 11, a first electrode layer 13, and a second electrode layer 15.

The vibration portion 11 may be provided between the first electrode layer 13 and the second electrode layer 15. The vibration portion 11 may include a piezoelectric material or an electroactive material having a piezoelectric effect.

For example, the piezoelectric material may have a characteristic where pressure or twisting is applied to a crystal structure by an external force, a potential difference occurs due to dielectric polarization caused by a relative position change of a positive (+) ion and a negative (−) ion, and a vibration is generated by an electric field based on a voltage applied thereto. The vibration layer 11 may include a ceramic-based material for implementing a relatively high vibration, or may include piezoelectric ceramic having a perovskite-based crystal structure.

The piezoelectric ceramic may include single-crystal ceramic having a single-crystal structure, or may include a ceramic material or poly-crystal ceramic having a poly-crystal structure. A piezoelectric material including single-crystal ceramic may include aluminum phosphate (for example, berlinite and $\alpha$-$AlPO_4$), silicon dioxide (for example, $\alpha$-$SiO_2$), lithium niobate ($LiNbO_3$), terbium molybate ($Tb_2(MoO_4)_3$), lithium tetraborate ($Li_2B_4O_7$), or zinc oxide (ZnO), but aspects of the present disclosure are not limited thereto. The piezoelectric material including single-crystal ceramic may include a lead zirconate titanate (PZT)-based material including lead (Pb), zirconium (Zr), and titanium (Ti) or may include a lead zirconate nickel niobate (PZNN)-based material including lead (Pb), zirconium (Zr), nickel (Ni), and niobium (Nb), but aspects of the present disclosure are not limited thereto. As another example, the vibration layer 11 may include at least one of $CaTiO_3$, $BaTiO_3$, and $SrTiO_3$ without Pb, but aspects of the present disclosure are not limited thereto.

The vibration layer 11 according to an aspect of the present disclosure may include a piezoelectric sintered material (or piezoelectric ceramic) which is manufactured by sintering (or firing) a piezoelectric powder (or a ceramic powder) at a high sintering (or firing) temperature of 1, 200° C. or more, but aspects of the present disclosure are not limited thereto. For example, the piezoelectric sintered material may be manufactured by a high temperature sintering process performed on a piezoelectric powder disposed on a high temperature firing paper.

A vibration layer 11 may include a first surface and a second surface which is different from (or opposite to) the first surface. For example, the first surface of the vibration layer 11 may be a lower surface, a rear surface, or a backside surface. The second surface of the vibration layer 11 may be an upper surface or a front surface.

The first electrode layer 13 may be provided on or coupled to the first surface (or the lower surface) of the vibration layer 11. The first electrode layer 13 may have the same size as that of the vibration layer 11, or may have a size which is less than that of the vibration layer 11. For example, the first electrode layer 13 may be a lower electrode layer, a rear electrode layer, a rearmost electrode layer, or a lowermost electrode layer, but aspects of the present disclosure are not limited thereto.

The second electrode layer 15 may be provided on or coupled to the second surface (or the upper surface) of the vibration layer 11. For example, a second electrode layer 15 may include a second surface which differs from the first surface of the vibration layer 11. For example, the second electrode layer 15 may have the same shape as that of the vibration layer 11, but aspects of the present disclosure are not limited thereto. For example, the second electrode layer 15 may be an upper electrode layer, a front electrode layer, a foremost electrode layer, or an uppermost electrode layer.

According to an aspect of the present disclosure, each of the first electrode layer 13 and the second electrode layer 15 may be formed at the other portion, except an edge portion or a periphery portion, of the vibration layer 11 to prevent an electrical connection (or short circuit) between the first electrode layer 13 and the second electrode layer 15. For example, the first electrode layer 13 may be formed on the whole first surface, except the edge portion or the periphery portion, of the vibration layer 11. For example, the second electrode layer 15 may be formed on the whole second surface, except the edge portion or the periphery portion, of the vibration layer 11. For example, a distance between a lateral surface (or an outer sidewall) of the vibration layer 11 and a lateral surface (or an outer sidewall) of each of the first electrode layer 13 and the second electrode layer 15 may be at least 0.5 mm or more, but aspects of the present disclosure are not limited thereto. For example, the distance between the lateral surface (or side surface) of the vibration layer 11 and the lateral surface (or side surface) of each of the first electrode layer 13 and the second electrode layer 15 may be at least 1 mm or more, but aspects of the present disclosure are not limited thereto.

According to an aspect of the present disclosure, one or more of the first electrode layer 13 and the second electrode layer 15 may include a transparent conductive material, a semitransparent conductive material, or an opaque conductive material. For example, the transparent or semitransparent conductive material of one or more of the first electrode layer 13 and the second electrode layer 15 may include indium tin oxide (ITO) or indium zinc oxide (IZO), but aspects of the present disclosure are not limited thereto. The opaque conductive material may include gold (Au), silver (Ag), platinum (Pt), palladium (Pd), molybdenum (Mo), magnesium (Mg), carbon, or glass frit-containing silver (Ag), or an alloy thereof, but aspects of the present disclosure are not limited thereto. For example, each of the first electrode layer 13 and the second electrode layer 15 may include silver (Ag) having a low resistivity, to enhance an electrical characteristic and/or a vibration characteristic of the vibration layer 11. For example, carbon may be a carbon material including carbon black, ketjen black, carbon nanotube, and graphite, but aspects of the present disclosure are not limited thereto.

In the first electrode layer 13 and the second electrode layer 15 including glass frit-containing silver (Ag), a content of glass frit may be about 1 wt % to about 12 wt %, but aspects of the present disclosure are not limited thereto. The glass frit may include a material based on PbO or $Bi_2O_3$, but aspects of the present disclosure are not limited thereto.

The vibration layer 11 may be polarized (or poling) by a certain voltage applied to the first electrode layer 13 and the second electrode layer 15 in a certain temperature atmosphere or a temperature atmosphere which is changed from a high temperature to a room temperature, but aspects of the present disclosure are not limited thereto. For example, the vibration layer 11 may alternately repeat contraction and/or expansion on the basis of an inverse piezoelectric effect based on a sound signal (or a voice signal) applied to the first electrode layer 13 and the second electrode layer 15 from the outside, and thus, may vibrate. For example, the vibration layer 11 may vibrate based on a vertical-direction vibration and a horizontal-direction vibration by using the first electrode layer 13 and the second electrode layer 15. Accordingly, the amount of displacement of the vibration portion 10 may increase or be enhanced based on the horizontal-direction contraction and/or expansion of the vibration layer 11.

The cover member 30 may be disposed at the first surface 10*a* of the vibration generating part 10. For example, the cover member 30 may be configured to cover the first surface of vibration generating part 10. For example, the cover member 30 may be configured to cover the first electrode layer 13 of the vibration generating part 10. Therefore, the cover member 30 may protect a first surface 10*a* of the vibration generating part 10, or may protect the first electrode layer 13 of the vibration generating part 10. For example, the vibration generating part 10 may be between the vibration member 50 and the cover member 30.

The first cover member 30 according to an aspect of the present disclosure may include one or more materials of plastic, fiber, cloth, paper, leather, rubber, and wood, but aspects of the present disclosure are not limited thereto. For example, the cover member 30 may be a polyimide film or a polyethylene terephthalate film, but aspects of the present disclosure are not limited thereto.

The cover member 30 according to an aspect of the present disclosure may include an adhesive member. For example, the cover member 30 may include an adhesive layer 40 which is coupled to or attached on the vibration generating part 10. For example, the adhesive layer 40 may include an electrical insulating material which has adhesive properties and is capable of compression and decompression. For example, the cover member 30 may include the adhesive layer 40 which is coupled to or attached on the first surface 10*a* or a first surface of the vibration generating part 10.

The cover member 30 may be connected with or coupled to the first electrode layer 13 or the first surface 10*a* of the vibration generating part 10 by the adhesive layer 40. For example, the cover member 30 may be connected with or coupled to the first electrode layer 13 or the first surface 10*a* of the vibration generating part 10 by a film laminating process using the adhesive layer 40.

The adhesive layer 40 may be between the first electrode layer 13 and the cover member 30. For example, the adhesive layer 40 may be disposed or filled between the cover member 30 and the first surface 10*a* of the vibration generating part 10. For example, the first surface 10*a* of the vibration generating part 10 may be embedded or buried in the adhesive layer 40. The adhesive layer 40 may include an electrical insulating material which has adhesive properties and is capable of compression and decompression. For example, the adhesive layer 40 may be a thermo-curable adhesive layer, but aspects of the present disclosure are not limited thereto. For example, the thermo-curable adhesive layer may include epoxy resin, acrylic resin, silicone resin, or urethane resin, but aspects of the present disclosure are not limited thereto.

The vibration member 50 may be disposed at a second surface 10*b* of the vibration generating part 10. For example, the vibration member 50 may be disposed to cover the second surface 10*b* of the vibration generating part 10. For example, the vibration member 50 may be configured to cover the second electrode layer 15 of the vibration generating part 10. Accordingly, the vibration member 50 may protect the second surface 10*b* of the vibration generating part 10, or may protect the second electrode layer 15 of the vibration generating part 10.

The vibration member 50 according to an aspect of the present disclosure may contact the vibration generating part 10. The vibration member 50 may contact the second surface 10*b* of the vibration generating part 10. The vibration member 50 may contact the second electrode layer 15 of the vibration generating part 10. For example, the vibration member 50 may directly contact the second electrode layer 15 of the vibration generating part 10. For example, a portion of the vibration generating part 10 may be inserted or accommodated into the vibration member 50. For example, at least a portion of the second surface 10*b* of the vibration generating part 10 may be inserted or accommodated into the vibration member 50. For example, the vibration member 50 may surround the second electrode layer 15 of the vibration generating part 10. For example, the vibration member 50 may surround the second electrode layer 15 of the vibration generating part 10 and may surround a lateral surface of the vibration layer 11. For example, the vibration member 50 may surround the second electrode layer 15 and may surround at least a portion of the lateral surface of the vibration layer 11.

A separate adhesive layer may not be provided between the vibration member 50 and the vibration generating part 10 according to an aspect of the present disclosure. The vibration member 50 may be attached on the second surface 10*b* of the vibration generating part 10 without a separate adhesive layer. The vibration member 50 may be attached on the second electrode layer 15 of the vibration generating part 10 without a separate adhesive layer.

According to an aspect of the present disclosure, the vibration generating part 10 may be directly connected with or coupled to the vibration member 50. For example, at least a portion of the vibration generating part 10 is configured to be one body with or directly connected with the vibration member 50. Accordingly, the loss of sound energy caused by layers between the vibration generating part 10 and the vibration member 50 may be reduced.

The vibration member 50 may include a material having an orientation. For example, the vibration member 50 may include fiber reinforced plastic. For example, the vibration member 50 may include a plastic material and a filler. For example, the plastic material may be fiber reinforced plastic. The vibration member 50 may be fiber reinforced plastic having an orientation. For example, the vibration member 50 may be thermo-curable resin including a fiber material, having an orientation, such as a carbon fiber, a glass fiber, a natural fiber, or an aramid fiber, but aspects of the present disclosure are not limited thereto. For example, the filler may be a fiber, a particle, or a rod, but aspects of the present disclosure are not limited thereto. For example, the filler may be mixed or dispersed in the plastic material of the vibration member 50, and the vibration member 50 may be configured to have an orientation by adjusting an orientation of the filler. For example, the vibration member 50 may be a vibration plate including a composite material.

For example, the vibration member 50 may be coupled to the vibration generating part 10 in a semi-cured state and may be cured, and thus, the vibration member 50 and the vibration generating part 10 may be implemented as one body. For example, the vibration member 50 may be coupled to the second surface 10*b* of the vibration generating part 10 in a semi-cured state and may be completely cured, and thus, the vibration member 50 and the vibration generating part 10 may be implemented as one body without a separate adhesive layer. For example, in pre-curing the vibration member 50 and the vibration generating part 10, at least a portion of the second surface 10*b* of the vibration generating part 10 may be inserted or accommodated into the vibration member 50 having a semi-cured state, and thus, at least a portion of the vibration generating part 10 may be provided as one body with or coupled to the vibration member 50. Accordingly, the vibration member 50 may be an integrated vibration member 50 which is provided as one body with the vibration generating part 10.

The inventors have performed various research and experiments on a material of the vibration member 50. This will be described below.

The following Table 1 shows a result obtained by comparing physical properties of the vibration member 50 according to an aspect of the present disclosure, a metal plate (for example, stainless steel (SUS)), and heat-resistant polypropylene (PP). For example, stainless steel (SUS) and polypropylene (PP) may be materials having high stiffness.

TABLE 1

| Material | Density [kg/m$^2$] | Young's Modulus [GPa] | Specific Modulus [kNm/kg] | Heat Deflection Temperature [° C.] |
|---|---|---|---|---|
| Stainless Steel | 8000 | 195 | 24.4 | — |
| Vibration Member | 1760 | 65 | 35.9 | 260 |
| Heat-resistant PP | 1150 | 3.4 | 3.0 | 137 |

As seen in Table 1, a density of the vibration member 50 according to an aspect of the present disclosure may be one of values within a range of 1,500 kg/m$^2$ to 5,000 kg/m$^2$. For example, a density of the vibration member 50 may be 1,760 kg/m$^2$. For example, a density of the metal plate (or SUS) may be 8,000 kg/m$^2$, and a density of heat-resistant PP may be 1,150 kg/m$^2$. Accordingly, it may be seen that the vibration member 50 according to an aspect of the present disclosure includes a material having a density which is lower than that of the metal plate (or SUS) and a density which is higher than that of heat-resistant PP.

A Young's modulus of the vibration member 50 according to an aspect of the present disclosure may be one of values within a range of 50 GPa to 200 GPa. For example, the Young's modulus of the vibration member 50 may be 65 GPa. For example, a Young's modulus of the metal plate (or SUS) may be 195 GPa, and a Young's modulus of heat-resistant PP may be 3.4 GPa. Accordingly, it may be seen that the vibration member 50 according to an aspect of the present disclosure includes a material having a Young's modulus which is lower than that of the metal plate (or SUS) and a Young's modulus which is higher than that of heat-resistant PP.

A specific modulus of the vibration member 50 according to an aspect of the present disclosure may be one of values within a range of 30 kNm/kg to 40 kNm/kg. The specific modulus may represent the stiffness of a material and may be a Young's modulus per density unit. For example, the vibration member 50 may have a specific modulus which has a high value as a material used as the vibration member 50 decreases in density and increases in stiffness. For example, the specific modulus may represent non-stiffness. For example, the specific modulus of the vibration member 50 may be 36.9 kNm/kg. For example, a specific modulus of the metal plate (or SUS) may be 24.4 kNm/kg, and a specific modulus of heat-resistant PP may be 3.0 kNm/kg. Accordingly, it may be seen that the vibration member 50 according to an aspect of the present disclosure includes a material having a specific modulus which is higher than that of each of the metal plate (or SUS) and heat-resistant PP.

A heat deflection temperature (HDT) of the vibration member 50 according to an aspect of the present disclosure may have one of values within a range of 230° C. to 300° C. For example, an HDT of the vibration member 50 may be 260° C. For example, an HDT of heat-resistant PP may be 137° C. Accordingly, it may be seen that the vibration member 50 according to an aspect of the present disclosure has an HDT which is higher than that of heat-resistant PP.

Therefore, the vibration member 50 according to an aspect of the present disclosure may include a material which is lower in density than the metal plate (or SUS) and is higher in Young's modulus, specific modulus, and HDT than heat-resistant PP. According to an aspect of the present disclosure, when a density is low and a Young's modulus and a specific modulus are high, a sound pressure level may be enhanced. Also, the vibration member 50 according to an aspect of the present disclosure may have a high HDT, and thus, may be applied to various fields (for example, vehicle industry, etc.). This will be described below with reference to FIG. 13.

The vibration member 50 according to an aspect of the present disclosure may include thermo-curable plastic having a semi-cured state, which has a low density and a high Young's modulus and includes a carbon fiber, and thus, an upper surface and a lower surface of the vibration member 50 may have adhesive properties. For example, at least a surface (the lower surface) of the vibration member 50 opposite to the vibration generating part 10 may have adhesive properties. Therefore, the vibration member 50 according to an aspect of the present disclosure may be attached on the second electrode layer 15 without a separate adhesive layer. Accordingly, an adhesive layer may not be provided between the vibration member 50 according to an aspect of the present disclosure and the second electrode layer 15, and thus, a weight of the vibration apparatus 1 may be reduced and a thickness of the vibration apparatus 1 may decrease.

The vibration member 50 according to an aspect of the present disclosure may include fiber reinforced plastic having an orientation, and thus, may implement a vibration even without a vibration plate being additionally provided at the upper surface of the vibration member 50. However, aspects of the present disclosure are not limited thereto, and the vibration member 50 according to an aspect of the present disclosure may have adhesive properties in a semi-cured state and may thus be easily attached/detached on/from a passive vibration member without a separate adhesive layer. For example, the passive vibration member may include one or more materials of metal, plastic, paper, fiber, cloth, leather, wood, rubber, glass, and carbon, or may include one or more of a display panel including a pixel configured to display an image, a screen panel on which an image is to be projected from a display apparatus, a light emitting diode illumination panel, an organic light emitting illumination panel, an inorganic light emitting illumination panel, a signage panel, a vehicular interior material, a vehicular exterior material, a vehicular glass window, an interior material of a vehicular seat, a ceiling material of a building, an interior material of a building, a window of a building, an interior material of an aircraft, a window of an aircraft, an interior material of a car, a window of a vehicle, and a mirror, but aspects of the present disclosure are not limited thereto.

Referring to FIGS. 1, 4, and 5, the signal cable 90 may be electrically connected with the vibration generating part 10, between the cover member 30 and the vibration member 50. For example, the signal cable 90 may be configured as a power supply member, a flexible cable, a flexible printed circuit cable, a flexible flat cable, a single-sided flexible printed circuit, a single-sided flexible printed circuit board (PCB), a flexible multi-layer printed circuit, a single-sided flexible PCB, or a flexible multi-layer PCB, but aspects of the present disclosure are not limited thereto.

The signal cable 90 according to an aspect of the present disclosure may include a base member 91, a first signal line 93, a second signal line 95, and an insulation layer 97.

The base member 91 may be provided on the first signal line 93. The base member 91 may cover the first signal line 93. The base member 91 may have a certain width in a first direction X and may extend long in a second direction Y intersecting with the first direction X. The base member 91 may include a transparent or opaque plastic material. For example, the base member 91 may include one or more of resins such as fluorine resin, polyimide-based resin, polyurethane-based resin, polyester-based resin, polyethylene-based resin, and polypropylene-based resin, but aspects of the present disclosure are not limited thereto. The base member 91 may be a base film or a base insulation film, but aspects of the present disclosure are not limited thereto.

The first signal line 93 may be provided between the vibration member 50 and the vibration generating part 10. The first signal line 93 may be provided between the vibration member 50 and the second electrode layer 15 of the vibration generating part 10. The first signal line 93 may be electrically connected with the second electrode layer 15 of the vibration generating part 10.

The first signal line 93 may be disposed at a first surface (or a rear surface) of the base member 91. For example, the first signal line 93 may be arranged at the first surface (or the rear surface) of the base member 91 in parallel with the second direction Y. For example, each of the first signal line 93 may be implemented in a line shape by patterning of a metal layer (or a conductive layer) which is formed or deposited at the first surface of the base member 91.

The signal cable 90 may be electrically connected with the vibration generating part 10. For example, an end portion (or a distal end portion or one side) 93*a* of the first signal line 93 of the signal cable 90 may be electrically connected with the vibration generating part 10. For example, an end portion 93*a* of the first signal line 93 of the signal cable 90 may be electrically connected with the vibration generating part 10 with being disposed to face the second surface 10*b* (or an upper electrode layer) of the vibration generating part 10. The end portion 93*a* of the first signal line 93 may be electrically connected with the second electrode layer 15, between the second surface 10*b* of the vibration generating part 10 and the vibration member 50. Accordingly, a driving signal (or a first driving signal) supplied from a vibration driving circuit may be supplied to the second electrode layer 15 of the vibration generating part 10 through the first signal line 93.

The second signal line 95 may be provided between the cover member 30 and the vibration generating part 10. The second signal line 95 may be provided between the cover member 30 and the first electrode layer 13 of the vibration generating part 10. The second signal line 95 may be electrically connected with a lower electrode layer of the vibration generating part 10 (or the first electrode layer 13 of the vibration generating part 10). For example, the second signal line 95 may be electrically connected with the first electrode layer 13 of the vibration generating part 10.

The second signal line 95 may be disposed at a second surface (or an upper surface) of an insulation layer 97. For example, the second signal line 95 may be arranged at the second surface (or the upper surface) of the insulation layer 97 in parallel with the second direction Y. For example, the second signal line 95 may be implemented in a line shape by patterning of a metal layer (or a conductive layer) which is formed or deposited at the second surface of the insulation layer 97.

An end portion (or a distal end portion or one side) 95*a* of the second signal line 95 of the signal cable 90 may be electrically connected with the vibration generating part 10. For example, the end portion 95*a* of the second signal line 95 of the signal cable 90 may be electrically connected with the vibration generating part 10 with being disposed to face the first surface 10*a* (or the lower electrode layer) of the vibration generating part 10. The end portion 95*a* of the second signal line 95 may be electrically connected with the first electrode layer 13, between the first surface 10*a* of the vibration generating part 10 and the cover member 30. Accordingly, a driving signal (or a second driving signal) supplied from the vibration driving circuit may be supplied to the first electrode layer 13 of the vibration generating part 10 through the second signal line 95.

Referring to FIG. 4, the insulation layer 97 may be provided under the second signal line 95. The insulation layer 97 may cover a first surface (or a lower surface) of the second signal line 95. The insulation layer 97 may have a certain width in the first direction X and may extend long in the second direction Y intersecting with the first direction X. The insulation layer 97 may be a protection layer, a coverlay, a coverlay film, a cover film, or a cover insulation film, but aspects of the present disclosure are not limited thereto. For example, the insulation layer 97 may include one or more of resins including fluoride resin, polyimide resin, polyurethane resin, polyester resin, polyethylene resin, and polypropylene resin, but aspects of the present disclosure are not limited thereto. The base member 91 may be a base film or a base insulation film, but aspects of the present disclosure are not limited thereto.

In FIG. 4, an end portion (or one side) of the signal cable 90 including an end portion 97*a* (or one side) of the insulation layer 97 illustrated by a dotted line may be inserted (or accommodated) between the vibration member 50 and the cover member 30 and may be connected with the vibration generating part 10. The end portion (or one side) of the signal cable 90 including the end portion 97*a* (or one side) of the insulation layer 97 may be inserted (or accommodated) and fixed between the vibration member 50 and the cover member 30 by using an adhesive layer 40 which is formed in the cover member 30.

For example, the end portion (or one side) of the signal cable 90 inserted (or accommodated) between the vibration member 50 and the cover member 30 may be inserted (or accommodated) between the vibration member 50 and the cover member 30 by a film laminating process using the adhesive layer 40. Therefore, the end portion 93*a* (or one side) of the first signal line 93 and the end portion 95*a* (or one side) of the second signal line 95 may be maintained with being electrically connected with the vibration generating part 10. Also, the end portion (or one side) of the signal cable 90 may be inserted (or accommodated) and fixed between the vibration member 50 and the cover member 30, thereby preventing a connection defect between the vibration generating part 10 and the signal cable 90 caused by the movement of the signal cable 90.

In FIG. 5, an end portion (or one side) of the signal cable 90 including an end portion 91*a* (or one side) of the based film 91 illustrated by a dotted line may be inserted (or accommodated) between the vibration member 50 and the cover member 30 and may be connected with the vibration generating part 10. The end portion (or one side) of the signal cable 90 including the end portion 91*a* (or one side) of the based film 91 may be inserted (or accommodated) and fixed between the vibration generating part 10 and the cover member 30. For example, a portion of the signal cable 90 may be inserted (or accommodated) and fixed between the vibration generating part 10 and the cover member 30.

According to an aspect of the present disclosure, the vibration member 50 may have elastic and adhesive properties, and thus, the end portion (or one side) of the signal cable 90 may be inserted (or accommodated) and fixed between the vibration generating part 10 and the vibration member 50 without a separate adhesive layer. Therefore, the end portion 93*a* (or one side) of the first signal line 93 may be maintained with being electrically connected with the second electrode layer 15 of the vibration generating part 10. Also, the end portion (or one side) of the signal cable 90 may be inserted (or accommodated) and fixed between the vibration member 50 and the second surface 10*b* of the vibration generating part 10, thereby preventing a connection defect between the vibration generating part 10 and the signal cable 90 caused by the movement of the signal cable 90.

In the signal cable 90 according to an aspect of the present disclosure, the end portion 91*a* (or one side) of the based film 91 and the end portion 97*a* (or one side) of the insulation layer 97 illustrated by dotted lines in FIGS. 4 and 5 may be removed. For example, the end portion 93*a* of the first signal line 93 may not be supported or covered by the end portion 91*a* of the base film 91 and may be exposed at the outside. For example, the end portion 95*a* of the second signal line 95 may not be supported or covered by the end portion 97*a* of the insulation layer 97 and may be exposed at the outside. For example, the end portion 93*a* of the first signal line 93 may protrude to have a certain length from the end portion 91*a* of the base film 91. For example, the end portion 95*a* of the second signal line 95 may protrude to have a certain length from the end portion 97*a* of the insulation layer 97. Accordingly, each of the end portions 93*a* and 95*a* of the first and second signal lines 93 and 95 may be individually or independently bent.

Referring to FIGS. 4 and 5, the end portion 93*a* of the first signal line 93 which is not supported by the base film 91 may be a first protrusion line, a first protrusion electrode, a first conductive line, a first conductive protrusion line, a first conductive wire, a first flexible protrusion line, a first flexible protrusion electrode, a first flexible conductive line, a first flexible conductive protrusion line, or a first flexible conductive wire, but aspects of the present disclosure are not limited thereto. For example, the end portion 95*a* of the second signal line 95 which is not supported by the insulation layer 97 may be a second protrusion line, a second protrusion electrode, a second conductive line, a second conductive protrusion line, a second conductive wire, a second flexible protrusion line, a second flexible protrusion electrode, a second flexible conductive line, a second flexible conductive protrusion line, or a second flexible conductive wire, but aspects of the present disclosure are not limited thereto. Accordingly, the signal cable 90 according to another aspect of the present disclosure may include a base film 91, first and second signal lines 93 and 95, first and second conductive protrusion lines 93*a* and 95*a*, and an insulation layer 97.

Each of the first and second signal lines 93 and 95 may be disposed between only the base film 91 and the insulation layer 97.

A first conductive protrusion line 93*a* may extend to pass through an end of the base film 91 from the first signal line 93. A second conductive protrusion line 95*a* may extend to pass through an end of the insulation layer 97 from the second signal line 95. The first conductive protrusion line 93*a* may be disposed and inserted (or accommodated) between the second surface 10*b* of the vibration generating part 10 and the vibration member 50. The second conductive protrusion line 95*a* may be disposed and inserted (or accommodated) between the first surface 10*a* of the vibration generating part 10 and the cover member 30. The first conductive line protrusion 93*a* may be electrically connected with the upper electrode layer of the vibration generating part 10 (or the second electrode layer 15 of the vibration generating part 10), between the second surface 10*b* of the vibration generating part 10 and the vibration member 50. The second conductive protrusion line 95*a* may be electrically connected with the lower electrode layer of the vibration generating part 10 (or the first electrode layer 13 of the vibration generating part 10), between the first surface 10*a* of the vibration generating part 10 and the cover member 30.

In the vibration apparatus 1 according to an aspect of the present disclosure, the first and second signal lines 93 and 95 of the signal cable 90 may be provided as one body with the second signal line 95, and thus, a soldering process for an electrical connection between the vibration generating part 10 and the signal cable 90 may not be needed, thereby simplifying a manufacturing process and a structure of the vibration apparatus 1. Also, the first and second signal lines 93 and 95 of the signal cable 90 may be electrically connected with the vibration generating part 10 in the same direction, and thus, a manufacturing process and a structure of the signal cable 90 may be simplified.

According to an aspect of the present disclosure, because a vibration member contacts a vibration generating portion, a separate adhesive layer may not be added, thereby providing a vibration apparatus and an apparatus including the same, which may be simplified in structure and manufacturing process.

According to an aspect of the present disclosure, a signal cable and a vibration apparatus may be provided as one body, and thus, may be configured as one part.

According to an aspect of the present disclosure, a vibration member having a high HDT may be provided, thereby providing a vibration apparatus which is good in heat resistance.

According to an aspect of the present disclosure, a thickness of a vibration apparatus may be reduced, and thus, a weight may decrease, thereby implementing a lightweight vibration apparatus. Also, in an aspect of the present disclosure, a manufacturing process may be simplified, and thus, process optimization may be implemented by reducing production energy.

Figure 6:
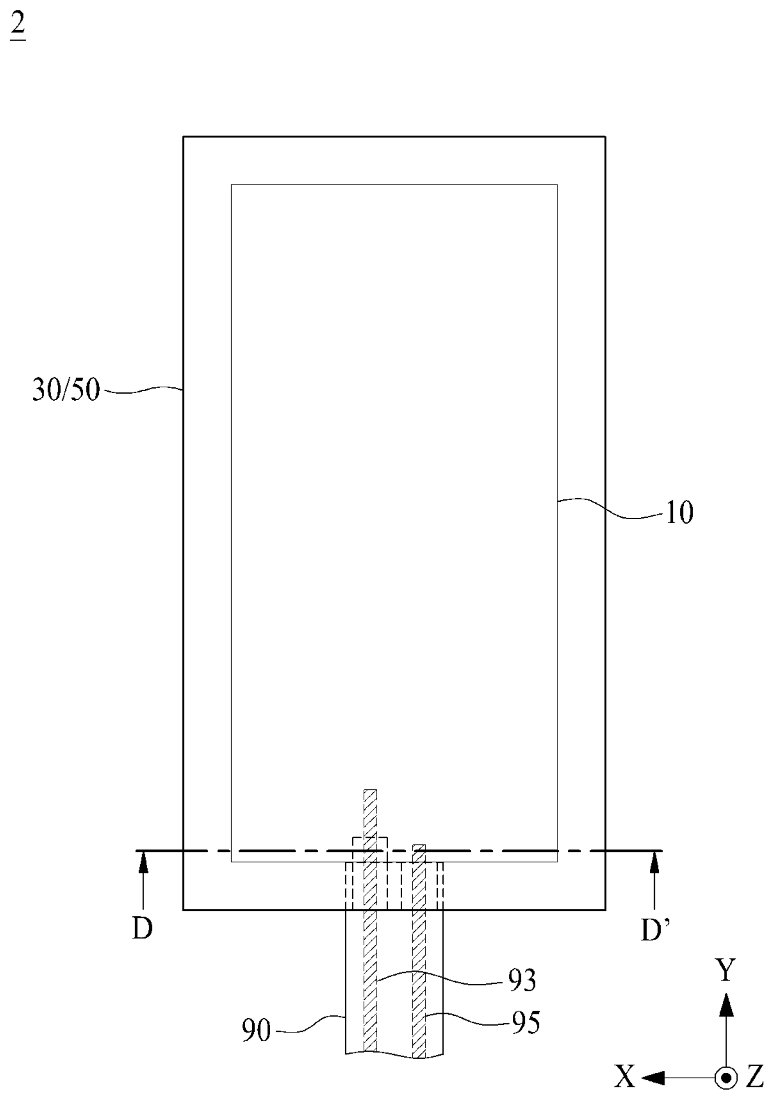
FIG. 6 illustrates a vibration apparatus according to another aspect of the present disclosure.
Figure 7:
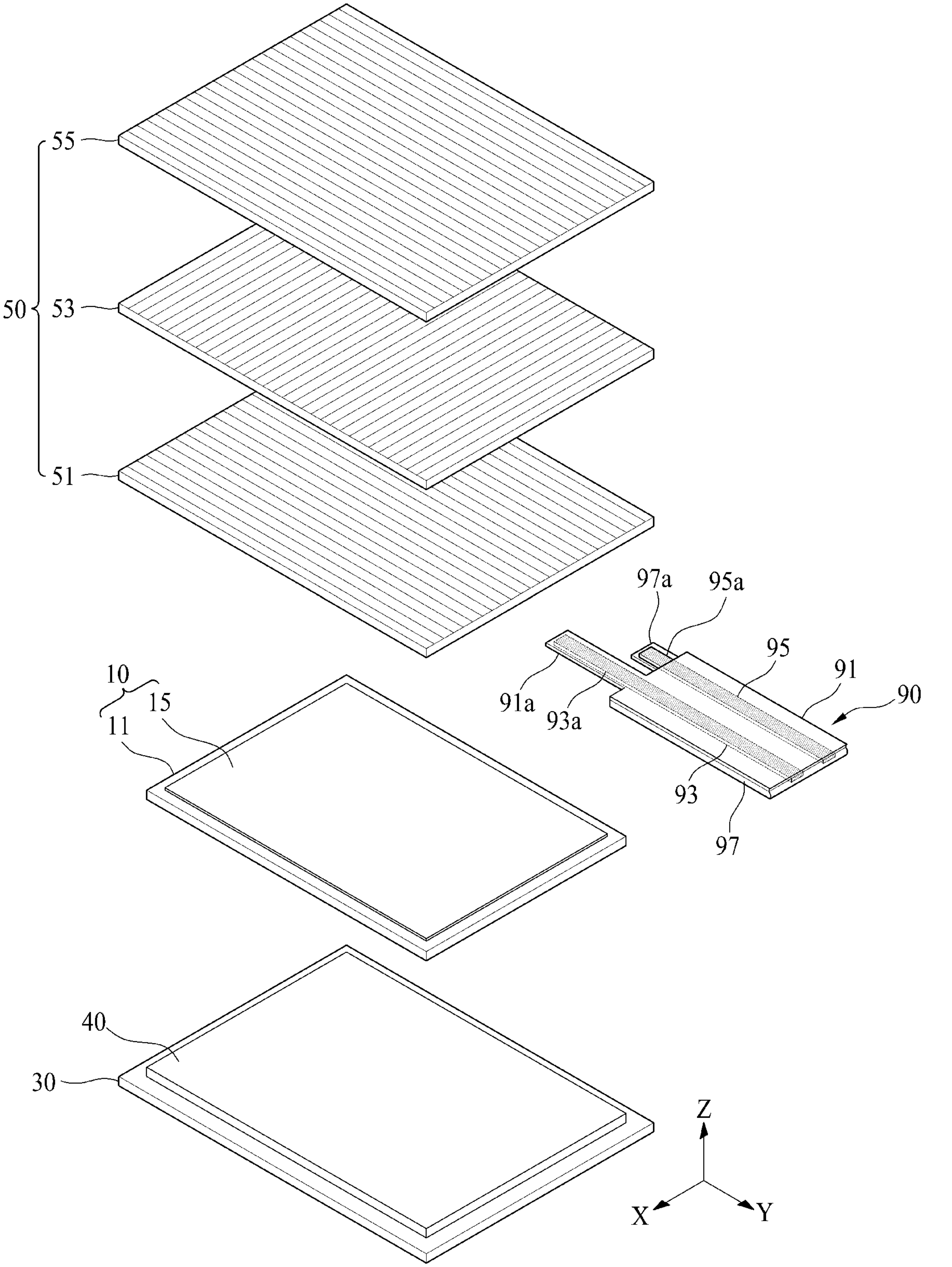
FIG. 7 is an exploded perspective view of the vibration apparatus illustrated in FIG. 6 according to another aspect of the present disclosure.
Figure 8:
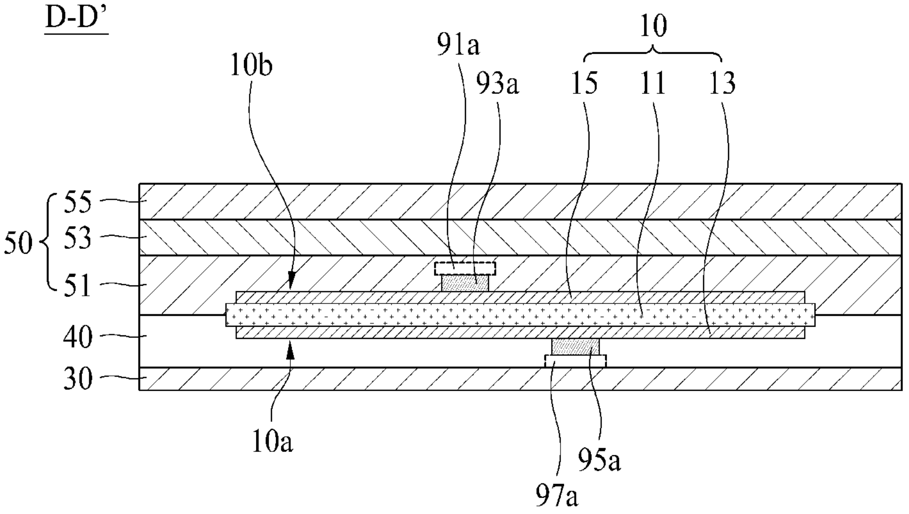
FIG. 8 is a cross-sectional view taken along line D-D' illustrated in FIG. 6 according to another aspect of the present disclosure.

FIG. 6 illustrates a vibration apparatus according to another aspect of the present disclosure. FIG. 7 is an exploded perspective view of the vibration apparatus illustrated in FIG. 6 according to another aspect of the present disclosure. FIG. 8 is a cross-sectional view taken along line D-D' illustrated in FIG. 6 according to another aspect of the present disclosure. Except for that the vibration member includes a first to third vibration plates, the vibration apparatus according to another aspect of the present disclosure may be the same as the a vibration apparatus according to an aspect of the present disclosure described above with reference to FIGS. 1 to 5. Hereinafter, therefore, different elements will be described Referring to FIGS. 6 to 8, a vibration apparatus 2 according to an aspect of the present disclosure may include a vibration generating part 10, a cover member 30, a vibration member 50, and a signal cable 90.

The vibration member 50 according to another aspect of the present disclosure may include a plurality of vibration plates. The plurality of vibration plates may have different orientations. For example, each of the plurality of vibration plates may include a filler. The filler may have different orientations. For example, the vibration member 50 may include a plurality of vibration plates which have different orientations and overlap each other.

The vibration member 50 according to another aspect of the present disclosure may include a first vibration plate 51, a second vibration plate 53, and a third vibration plate 55. For example, each of the first vibration plate 51, the second vibration plate 53, and the third vibration plate 55 may include a material having an orientation.

The first vibration plate 51 may be disposed at a second surface **10*b* of a vibration generating part 10. For example, the first vibration plate 51 may be configured to cover the second surface 10*b* of the vibration generating part 10. For example, the first vibration plate 51 may be configured to cover a second electrode layer 15 of the vibration generating part 10. Accordingly, the first vibration plate 51 may protect the second surface 10*b* of the vibration generating part 10, or may protect the second electrode layer 15 of the vibration generating part 10**.

The first vibration plate 51 according to another aspect of the present disclosure may contact the vibration generating part 10. The first vibration plate 51 may contact the second surface **10*b* of the vibration generating part 10. The first vibration plate 51 may contact the second electrode layer 15 of the vibration generating part 10**.

A separate adhesive layer may not be provided between the vibration generating part 10 and the first vibration plate 51 according to another aspect of the present disclosure. For example, the first vibration plate 51 may have a semi-cured state. Therefore, the first vibration plate 51 may have elasticity. Therefore, the first vibration plate 51 may be attached on the second surface **10*b* of the vibration generating part 10 without a separate adhesive layer. The first vibration plate 51 may be attached on the second electrode layer 15 of the vibration generating part 10 without a separate adhesive layer. For example, the first vibration plate 51 may include a material which includes a carbon fiber and has an orientation. The first vibration plate 51** may include fiber reinforced plastic having an orientation.

Referring to FIGS. 7 and 8, according to an aspect of the present disclosure, the first vibration plate 51, the second vibration plate 53, and the third vibration plate 55 may include a filler having an orientation. The first vibration plate 51 according to another aspect of the present disclosure may have an orientation which differs from that of the second vibration plate 53. For example, an orientation may be an orientation of the filler. For example, in an aspect of the present disclosure, a stack angle may be controlled in a semi-curing step (for example, a prepreg step), and thus, the fillers of the first vibration plate 51 and the second vibration plate 53 may be arranged to have different orientations. For example, the semi-curing step may be a semi-curing step which is performed on the vibration member 50 before the vibration member 50 is coupled to the vibration generating part 10. For example, the first vibration plate 51 may have an orientation which is aligned vertical to the second vibration plate 53, but aspects of the present disclosure are not limited thereto. For example, when an orientation of the filler of the first vibration plate 51 is 0 degrees, an orientation of the filler of the second vibration plate 53 may be 90 degrees. For example, when an orientation of the filler of the first vibration plate 51 is 90 degrees, an orientation of the filler of the second vibration plate 53 may be 0 degrees.

The first vibration plate 51 according to another aspect of the present disclosure may have the same orientation as that of the third vibration plate 55. For example, fillers between the first vibration plate 51 and the third vibration plate 55 may have the same orientation. The first vibration plate 51 may have an orientation which is aligned in parallel with the third vibration plate 55. For example, when an orientation of the filler of the first vibration plate 51 is 0 degrees, an orientation of the filler of the third vibration plate 55 may be 0 degrees. For example, when an orientation of the filler of the first vibration plate 51 is 90 degrees, an orientation of the filler of the third vibration plate 55 may be 90 degrees.

The second vibration plate 53 according to another aspect of the present disclosure may be disposed at a second surface (or an upper surface) of the first vibration plate 51. For example, the second vibration plate 53 may be configured to cover the second surface (or the upper surface) of the first vibration plate 51. Accordingly, the second vibration plate 53 may additionally protect the second surface **10*b* of the vibration generating part 10 or protect the second electrode layer 15 of the vibration generating part 10**.

The second vibration plate 53 according to an aspect of the present disclosure may have an orientation which differs from that of each of the first vibration plate 51 and the third vibration plate 55. The filler of the second vibration plate 53 may have an orientation which differs from that of the filler of each of the first vibration plate 51 and the third vibration plate 55. For example, the filler of the second vibration plate 53 may have an orientation which is aligned vertical to the filler of each of the first vibration plate 51 and the third vibration plate 55. The second vibration plate 53 may have an orientation which is aligned vertical to each of the first vibration plate 51 and the third vibration plate 55, but aspects of the present disclosure are not limited thereto. For example, when an orientation of the filler of the second vibration plate 53 is 90 degrees, an orientation of the filler of each of the first vibration plate 51 and the third vibration plate 55 may be 0 degrees. For example, when an orientation of the filler of the second vibration plate 53 is 0 degrees, an orientation of the filler of each of the first vibration plate 51 and the third vibration plate 55 may be 90 degrees.

A separate adhesive layer may not be provided between the first vibration plate 51 and the second vibration plate 53 according to another aspect of the present disclosure. For example, the second vibration plate 53 may have a semi-cured state. Therefore, the second vibration plate 53 may have elastic and adhesive properties. Therefore, the second vibration plate 53 may be attached on a second surface (or an upper surface) of the first vibration plate 51 without a separate adhesive layer. For example, the second vibration plate 53 may include a material which includes a carbon fiber and has an orientation. The second vibration plate 53 may include fiber reinforced plastic having an orientation. For example, the second vibration plate 53 may have an orientation which differs from that of each of the first vibration plate 51 and the third vibration plate 55.

The third vibration plate 55 according to another aspect of the present disclosure may be disposed at a second surface (or an upper surface) of the second vibration plate 53. For example, the third vibration plate 55 may be configured to cover the second surface (or the upper surface) of the second vibration plate 53. Accordingly, the third vibration plate 55 may additionally protect the second surface **10*b* of the vibration generating part 10 or protect the second electrode layer 15 of the vibration generating part 10**.

The third vibration plate 55 according to another aspect of the present disclosure may have an orientation which differs from that of the second vibration plate 53. The third vibration plate 55 may have an orientation which is aligned vertical to the second vibration plate 53, but aspects of the present disclosure are not limited thereto. For example, when an orientation of the filler of the third vibration plate 55 is 0 degrees, an orientation of the filler of the second vibration plate 53 may be 90 degrees. For example, when an orientation of the filler of the third vibration plate 55 is 90 degrees, an orientation of the filler of the second vibration plate 53 may be 0 degrees.

The third vibration plate 55 according to another aspect of the present disclosure may have the same orientation as that of the first vibration plate 51. The third vibration plate 55 may have an orientation which is aligned in parallel with the first vibration plate 51. For example, when an orientation of the filler of the third vibration plate 55 is 0 degrees, an orientation of the filler of the first vibration plate 51 may be 0 degrees. For example, when an orientation of the filler of the third vibration plate 55 is 90 degrees, an orientation of the filler of the first vibration plate 51 may be 90 degrees.

A separate adhesive layer may not be provided between the second vibration plate 53 and the third vibration plate 55 according to another aspect of the present disclosure. For example, the third vibration plate 55 may include the same material as that of the first vibration plate 55 and may have the same orientation of the filler as that of the first vibration plate 55. For example, the third vibration plate 55 may include a material having an orientation. For example, the third vibration plate 55 may include thermo-curable plastic which includes a carbon fiber and has a semi-cured state. Therefore, the third vibration plate 55 may have elastic and adhesive properties. Accordingly, because the third vibration plate 55 has elastic and adhesive properties, the third vibration plate 55 may be attached on a second surface (or an upper surface) of the second vibration plate 53 without a separate adhesive layer.

Because the vibration member 50 having an orientation is provided, the vibration apparatus 2 according to another aspect of the present disclosure may have substantially the same effect as an aspect of the present disclosure described above with reference to FIGS. 1 to 5.

According to another aspect of the present disclosure, an orientation of the filler of the first vibration plate 51 may be the same as that of the filler of the third vibration plate 55, and thus, the first and third vibration plates 51 and 55 may have relatively strong stiffness. An orientation of the filler of the first vibration plate 51 may differ from that of the filler of the second vibration plate 53, and thus, the first and second vibration plates 51 and 53 may have relatively small stiffness. Accordingly, a resonance frequency of the vibration apparatus 2 may be easily adjusted, and peak and/or dip may be easily adjusted. Therefore, a sound pressure level characteristic of a sound of the vibration apparatus 2 may be more enhanced. In the vibration apparatus 2 according to another aspect of the present disclosure, the vibration member 50 may include the first to third vibration plates 51, 53, and 55, orientations of the fillers of the first vibration plate 51 and the third vibration plate 55 may be identically aligned, orientations of the fillers of the first vibration plate 51 and the second vibration plate 53 may be differently aligned, and orientations of the fillers of the second vibration plate 53 and the third vibration plate 55 may be differently aligned, and thus, a resonance frequency of the vibration apparatus 2 may be easily adjusted. Therefore, a sound pressure level characteristic of a sound of the vibration apparatus 2 may be more enhanced.

Figure 9:
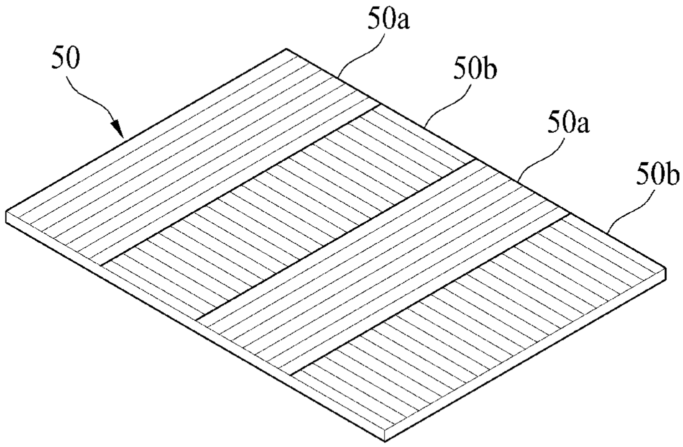
FIG. 9 illustrates a vibration member according to another aspect of the present disclosure.

FIG. 9 illustrates a vibration member according to another aspect of the present disclosure. Except for that the vibration member includes a plurality of first vibration parts and a second vibration part, the vibration apparatus according to another aspect of the present disclosure may be the substantially same as the a vibration apparatus according to an aspect of the present disclosure described above with reference to FIGS. 1 to 5. Hereinafter, therefore, different elements will be described.

Referring to FIG. 9, the vibration member 50 according to another aspect of the present disclosure may include a plurality of vibration portions **50*a* and 50*b*. For example, the plurality of vibration portions 50*a* and 50*b* may be arranged in parallel. For example, the vibration member 50 may include a plurality of first vibration portions 50*a* and a second vibration portion 50*b*. The plurality of first vibration portions 50*a* may be spaced apart from each other with the second vibration portion 50*b* therebetween. The plurality of first vibration portions 50*a* may be arranged in parallel with the second vibration portion 50*b* therebetween. The second vibration portion 50*b* may be provided between adjacent first vibration portions 50*a* of the plurality of first vibration portions 50*a*. For example, the second vibration portion 50*b* may be provided in parallel with the first vibration portion 50*a*, between adjacent first vibration portions 50*a* of the plurality of first vibration portions 50*a***.

The plurality of first vibration portions **50*a* may include a material having an orientation. The plurality of first vibration portions 50*a* may include fiber reinforced plastic having an orientation. The second vibration portion 50*b* may include a material having an orientation. The second vibration portion 50*b*** may include fiber reinforced plastic having an orientation.

Each of the plurality of vibration portions **50*a*, 50*b* may have different orientations. For example, the plurality of first vibration portions 50*a* and the second vibration portion 50*b* may have different orientations. For example, orientations of fillers of the plurality of first vibration portions 50*a* and the second vibration portion 50*b* may differ. For example, the fillers of the plurality of first vibration portions 50*a* and the second vibration portion 50*b* may have orientations vertical to each other, but aspects of the present disclosure are not limited thereto. For example, when an orientation of the filler of each of the plurality of first vibration portions 50*a* is 90 degrees, an orientation of the filler of the second vibration portion 50*b* may be 0 degrees. For example, when an orientation of the filler of each of the plurality of first vibration portions 50*a* is 0 degrees, an orientation of the filler of the second vibration portion 50*b*** may be 90 degrees.

Because the vibration member 50 is provided, the vibration apparatus according to another aspect of the present disclosure may have substantially the same effect as an aspect of the present disclosure described above with reference to FIGS. 1 to 5.

In the vibration apparatus 2 according to another aspect of the present disclosure, the vibration member 50 may include a first vibration portion **50*a* and a second vibration portion 50*b* which are arranged in parallel and a filler of the first vibration portion 50*a* and a filler of the second vibration portion 50*b*** may differ in orientation, and thus, a resonance frequency of the vibration apparatus may be easily adjusted. Accordingly, the vibration apparatus according to another aspect of the present disclosure may more enhance a sound pressure level characteristic of a sound.

In another aspect, the second vibration portion **50*b* and each of the plurality of first vibration portions 50*a* may include carbon fibers having different volumes. For example, each of the plurality of first vibration portions 50*a* may include a carbon fiber which is more in volume than a carbon fiber of the second vibration portion 50*b*. For example, each of the plurality of first vibration portions 50***a* may include a carbon fiber which is one to two times more in volume than the carbon fiber of the second vibration portion 50*b*. As another example, the second vibration portion 50*b* may include a carbon fiber which is more in volume than the carbon fiber of each of the plurality of first vibration portions 50*a*. For example, the second vibration portion 50*b* may include a carbon fiber which is one to two times more in volume than the carbon fiber of each of the plurality of first vibration portions 50*a*. Therefore, a volume of the carbon fiber of each of the plurality of first vibration portions 50*a* and a volume of the carbon fiber of the second vibration portion 50*b* may be differently set, and thus, a resonance frequency of the vibration apparatus may be easily adjusted. In another aspect of the present disclosure, a sound pressure level characteristic of a sound of a vibration apparatus may be more enhanced.

In another aspect, the second vibration portion 50*b* and each of the plurality of first vibration portions 50*a* may have different stiffness. The stiffness of the second vibration portion 50*b* and the stiffness of each of the plurality of first vibration portions 50*a* may be differently set based on a material of a filler. For example, the filler may include poly-acrylonitrile (PAN)-based fiber, obtained by polymerizing and radiating acrylonitrile, and a pitch-based fiber which includes a pitch remaining after distillation is performed in a petroleum and coal process. For example, when the filler of each of the plurality of first vibration portions 50*a* includes the PAN-based fiber, the second vibration portion 50*b* may include the pitch-based fiber. For example, when the filler of each of the plurality of first vibration portions 50*a* includes the pitch-based fiber, the second vibration portion 50*b* may include the PAN-based fiber. Therefore, because the stiffness of each of the plurality of first vibration portions 50*a* and the stiffness of the second vibration portion 50*b* are differently set, the vibration member 50 may easily adjust a resonance frequency of the vibration apparatus and may easily adjust peak and/or dip. Accordingly, the vibration apparatus according to another aspect of the present disclosure may more enhance a sound pressure level characteristic of a sound. For example, peak may be a phenomenon where a sound pressure level bounces in a specific frequency, and dip may be a phenomenon where a low sound pressure level occurs because the occurrence of a sound is prevented in a specific frequency.

Figure 10:
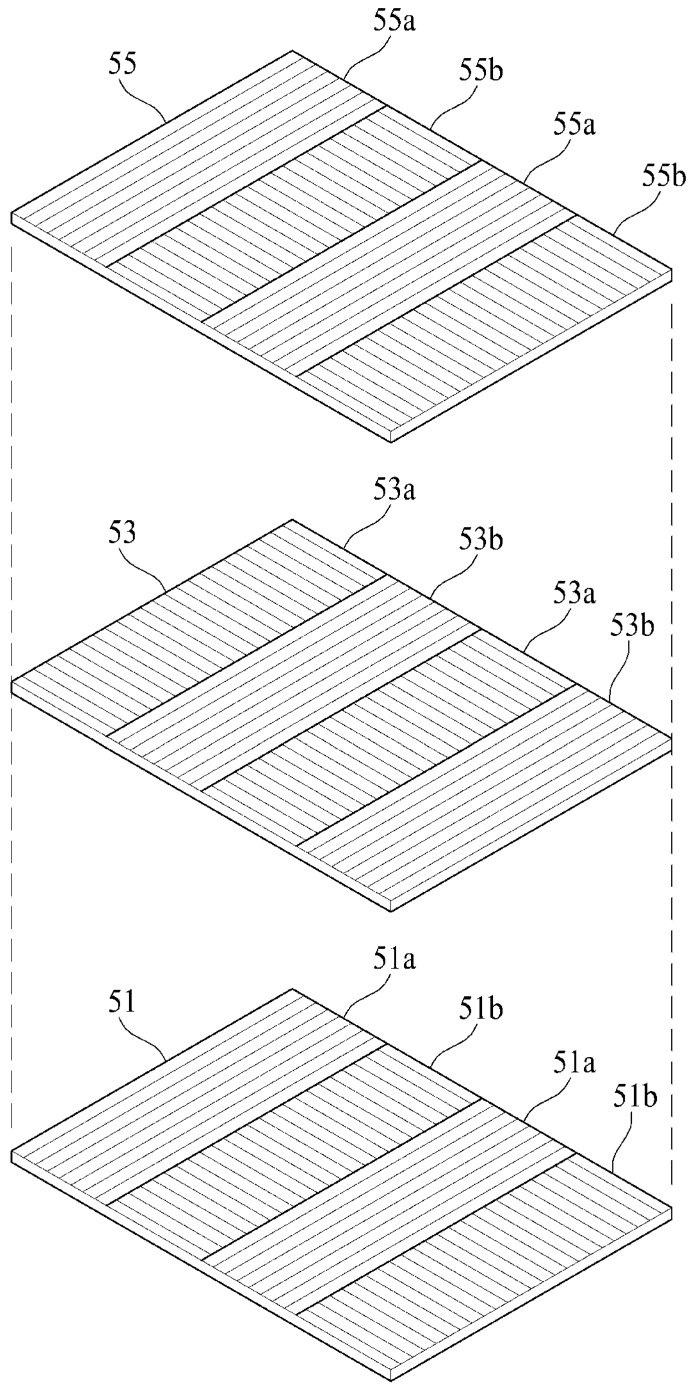
FIG. 10 illustrates a vibration member according to another aspect of the present disclosure.

FIG. 10 illustrates a vibration member according to another aspect of the present disclosure. Except for that each of first to third vibration plates of a vibration member includes a plurality of first vibration portions and a second vibration portion, another aspect of the present disclosure may be the substantially same as another aspect of the present disclosure described above with reference to FIGS. 6 to 8. Hereinafter, therefore, different elements will be described.

Referring to FIG. 10, the vibration member 50 according to another aspect of the present disclosure may include a first vibration plate 51, a second vibration plate 53, and a third vibration plate 55. Each of the first vibration plate 51, the second vibration plate 53, and the third vibration plate 55 may include a plurality of vibration portions 51*a*, 53*a*, and 53*a* and a plurality of vibration portions 51*b*, 53*b*, and 55*b*. For example, the plurality of vibration portions 51*b*, 53*b*, and 55*b* may be arranged in parallel between the plurality of vibration portions 51*a*, 53*a*, and 53*a*.

The first vibration plate 51 may include a plurality of first vibration portions 51*a* and a plurality of second vibration portions 51*b*. The plurality of first vibration portions 51*a* provided in the first vibration plate 51 may be spaced apart from one another with the second vibration portion 51*b* therebetween. The plurality of first vibration portions 51*a* provided in the first vibration plate 51 may be arranged in parallel with the second vibration portion 51*b* therebetween. The plurality of second vibration portions 51*b* provided in a plurality of first vibration plates 51 may be provided between a plurality of first vibration portions 51*a*.

Each of the plurality of first vibration portions 51*a* and the second vibration portion 51*b* provided in the first vibration plate 51 may include a filler having an orientation. For example, the plurality of first vibration portions 51*a* and the second vibration portion 51*b* may have different orientations. Each of the plurality of first vibration portions 51*a* and the second vibration portion 51*b* may include fiber reinforced plastic including a carbon fiber. For example, the plurality of first vibration portions 51*a* and the second vibration portion 51*b* provided in the first vibration plate 51 may have an orientation of fillers vertical to each other, but aspects of the present disclosure are not limited thereto.

The second vibration plate 53 according to another aspect of the present disclosure may be disposed at a second surface (or an upper surface) of the first vibration plate 51. The second vibration plate 53 may include a plurality of first vibration portions 53*a* and a plurality of second vibration portions 53*b*. The plurality of first vibration portions 53*a* provided in the second vibration plate 53 may be spaced apart from one another with the second vibration portion 53*b* therebetween. The plurality of first vibration portions 53*a* provided in the second vibration plate 53 may be arranged in parallel with the second vibration portion 53*b* therebetween. The plurality of second vibration portions 53*b* provided in a plurality of second vibration plates 53 may be provided between a plurality of first vibration portions 53*a*.

Each of the plurality of first vibration portions 53*a* and the second vibration portion 53*b* provided in the second vibration plate 53 may include a filler having an orientation. For example, each of the plurality of first vibration portions 53*a* and the second vibration portion 53*b* may include fiber reinforced plastic including a carbon fiber.

The fillers of the plurality of first vibration portions 53*a* and the second vibration portion 53*b* provided in the second vibration plate 53 may have different orientations. For example, the plurality of first vibration portions 53*a* and the second vibration portion 53*b* provided in the second vibration plate 53 may have an orientation of fillers vertical to each other, but aspects of the present disclosure are not limited thereto.

The plurality of first vibration portions 51*a* of the first vibration plate 51 and the plurality of first vibration portions 53*a* of the second vibration plate 53 according to another aspect of the present disclosure may be connected with or attached on each other to face each other. For example, the plurality of first vibration portions 51*a* of the first vibration plate 51 and the plurality of first vibration portions 53*a* of the second vibration plate 53 may have different orientations. For example, the plurality of first vibration portions 51*a* of the first vibration plate 51 and the plurality of first vibration portions 53*a* of the second vibration plate 53 facing (or corresponding to) the plurality of first vibration portions 51*a* of the first vibration plate 51 may have different orientations. For example, an orientation of the fillers of the plurality of first vibration portions 51*a* of the first vibration plate 51 may differ from an orientation of the fillers of the plurality of first vibration portions 53*a* of the second vibration plate 53. For example, when an orientation of the filler of each of the plurality of first vibration portions 51*a* of the first vibration plate 51 is 90 degrees, an orientation of the filler of the plurality of first vibration portions 53*a* of the second vibration plate 53 may be 0 degrees. For example, when an orientation of the filler of each of the plurality of first vibration portions 51*a* of the first vibration plate 51 is 0 degrees, an orientation of the filler of the plurality of first vibration portions 53*a* of the second vibration plate 53 may be 90 degrees.

The plurality of second vibration portions 51*b* of the first vibration plate 51 and the plurality of second vibration portions 53*b* of the second vibration plate 53 according to another aspect of the present disclosure may be connected with or attached on each other to face each other. For example, the plurality of second vibration portions 51*b* of the first vibration plate 51 and the plurality of second vibration portions 53*b* of the second vibration plate 53 may have different orientations. For example, the plurality of second vibration portions 51*b* of the first vibration plate 51 and the plurality of second vibration portions 53*b* of the second vibration plate 53 facing (or corresponding to) the plurality of second vibration portions 51*b* of the first vibration plate 51 may have different orientations. For example, an orientation of the fillers of the plurality of second vibration portions 51*b* of the first vibration plate 51 may differ from an orientation of the fillers of the plurality of second vibration portions 53*b* of the second vibration plate 53. For example, when an orientation of the filler of each of the plurality of second vibration portions 51*b* of the first vibration plate 51 is 0 degrees, an orientation of the filler of the plurality of second vibration portions 53*b* of the second vibration plate 53 may be 90 degrees. For example, when an orientation of the filler of each of the plurality of second vibration portions 51*b* of the first vibration plate 51 is 90 degrees, an orientation of the filler of the plurality of second vibration portions 53*b* of the second vibration plate 53 may be 0 degrees.

The third vibration plate 55 according to another aspect of the present disclosure may be disposed at a second surface (or an upper surface) of the second vibration plate 53. The third vibration plate 55 may include a plurality of first vibration portions 55*a* and a plurality of second vibration portions 55*b*. The plurality of first vibration portions 55*a* provided in the third vibration plate 55 may be spaced apart from one another with the second vibration portion 55*b* therebetween. The plurality of first vibration portions 55*a* provided in the third vibration plate 55 may be arranged in parallel with the second vibration portion 55*b* therebetween. The plurality of second vibration portions 55*b* provided in a plurality of third vibration plates 55 may be provided between adjacent first vibration portions 55*a* of a plurality of first vibration portions 55*a*, and may be arranged in parallel with the plurality of the first vibration portions 55*a*.

Each of the plurality of first vibration portions 55*a* and the second vibration portion 55*b* provided in the third vibration plate 55 may include a filler having an orientation. For example, each of the plurality of first vibration portions 55*a* and the second vibration portion 55*b* may include fiber reinforced plastic including a carbon fiber, but aspects of the present disclosure are not limited thereto.

The fillers of the plurality of first vibration portions 55*a* and the second vibration portion 55*b* provided in the third vibration plate 55 may have different orientations. For example, an orientation of the filler of each of the plurality of first vibration portions 55*a* may differ from that of the filler of the second vibration portion 55*b*. For example, the plurality of first vibration portions 55*a* and the second vibration portion 55*b* provided in the third vibration plate 55 may have an orientation of fillers vertical to each other, but aspects of the present disclosure are not limited thereto.

The plurality of first vibration portions 51*a* of the first vibration plate 51 and the plurality of first vibration portions 55*a* of the third vibration plate 55 according to another aspect of the present disclosure may have the same orientation. For example, the plurality of first vibration portions 51*a* of the first vibration plate 51 and the plurality of first vibration portions 55*a* of the third vibration plate 55 corresponding to the plurality of first vibration portions 51*a* of the first vibration plate 51 may have the same orientation. For example, an orientation of the filler of each of the plurality of first vibration portions 51*a* of the first vibration plate 51 may be the same as that of the filler of each of the plurality of first vibration portions 55*a* of the third vibration plate 55.

The plurality of second vibration portions 51*b* of the first vibration plate 51 and the plurality of second vibration portions 55*b* of the third vibration plate 55 according to another aspect of the present disclosure may have the same orientation. For example, the plurality of second vibration portions 51*b* of the first vibration plate 51 and the plurality of second vibration portions 55*b* of the third vibration plate 55 corresponding to the plurality of second vibration portions 51*b* of the first vibration plate 51 may have the same orientation. For example, an orientation of the filler of each of the plurality of second vibration portions 51*b* of the first vibration plate 51 may be the same as that of the filler of each of the plurality of second vibration portions 55*b* of the third vibration plate 55.

The plurality of first vibration portions 55*a* of the third vibration plate 55 and the plurality of first vibration portions 53*a* of the second vibration plate 53 according to another aspect of the present disclosure may be connected with or attached on each other to face each other. For example, the filler of each of the plurality of first vibration portions 55*a* of the third vibration plate 55 and the filler of each of the plurality of first vibration portions 53*a* of the second vibration plate 53 may have different orientations. For example, when an orientation of the filler of each of the plurality of first vibration portions 55*a* of the third vibration plate 55 is 90 degrees, an orientation of the filler of the plurality of first vibration portions 53*a* of the second vibration plate 53 may be 0 degrees. For example, when an orientation of the filler of each of the plurality of first vibration portions 55*a* of the third vibration plate 55 is 0 degrees, an orientation of the filler of the plurality of first vibration portions 53*a* of the second vibration plate 53 may be 90 degrees.

The plurality of second vibration portions 55*b* of the third vibration plate 55 and the plurality of second vibration portions 53*b* of the second vibration plate 53 according to another aspect of the present disclosure may be connected with or attached on each other to face each other. For example, the plurality of second vibration portions 55*b* of the third vibration plate 55 and the plurality of second vibration portions 53*b* of the second vibration plate 53 may have different orientations. For example, the filler of each of the plurality of second vibration portions 55*b* of the third vibration plate 55 and the filler of each of the plurality of second vibration portions 53*b* of the second vibration plate 53 may have different orientations. For example, when an orientation of the filler of each of the plurality of second vibration portions 55*b* of the third vibration plate 55 is 0 degrees, an orientation of the filler of the plurality of second vibration portions 53*b* of the second vibration plate 53 may be 90 degrees. For example, when an orientation of the filler of each of the plurality of second vibration portions 55*b* of the third vibration plate 55 is 90 degrees, an orientation of the filler of the plurality of second vibration portions 53*b* of the second vibration plate 53 may be 0 degrees.

Because the vibration member 50 including the first to third vibration plates 51, 53, and 55 are provided, the vibration apparatus according to another aspect of the present disclosure may have substantially the same effect as an aspect of the present disclosure described above with reference to FIGS. 6 to 8.

In the vibration apparatus according to another aspect of the present disclosure, the first to third vibration plates 51, 53, and 55 may respectively include the first vibration portions 51*a*, 53*a*, and 55*a* and may respectively include the second vibration portions 51*b*, 53*b*, and 55*b* and orientations of fillers of vibration portions attached on each other to face each other may be differently set, and thus, a resonance frequency of the vibration apparatus may be easily adjusted. Accordingly, the vibration apparatus according to another aspect of the present disclosure may more enhance a sound pressure level characteristic of a sound.

Figure 11:
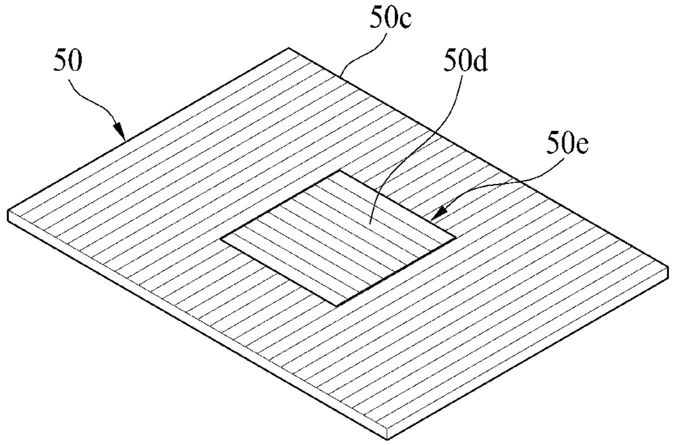
FIG. 11 illustrates a vibration member according to another aspect of the present disclosure.

FIG. 11 illustrates a vibration member according to another aspect of the present disclosure. Except for that the vibration member includes a third vibration portion and a fourth vibration portion, the vibration apparatus according to another aspect of the present disclosure may be the substantially same as the a vibration apparatus according to an aspect of the present disclosure described above with reference to FIGS. 1 to 5. Hereinafter, therefore, different elements will be described.

Referring to FIG. 11, a vibration member 50 according to another aspect of the present disclosure may include a third vibration portion 50*c* and a fourth vibration portion 50*d*. The third vibration portion 50*c* may include an accommodating portion (or an inserting portion) 50*e* provided therein. The accommodating portion (or the inserting portion) 50*e* may be provided to pass through the third vibration portion 50*c*. The inserting portion 50*e* may be provided at a center of the third vibration portion 50*c*, but aspects of the present disclosure are not limited thereto and the inserting portion 50*e* may be provided at a position corresponding to one right surface, one left surface, one left surface, or one upper surface of the third vibration portion 50*c*. The fourth vibration portion 50*d* may be inserted (or accommodated) into the accommodating portion (or the inserting portion) 50*e* provided in the third vibration portion 50*c*.

The third vibration portion 50*c* and the fourth vibration portion 50*d* may have different orientations. For example, the third vibration portion 50*c* and the fourth vibration portion 50*d* may include a material having an orientation. Each of the third vibration portion 50*c* and the fourth vibration portion 50*d* may be fiber reinforced plastic having an orientation of a filler. For example, orientations of fillers of the third vibration portion 50*c* and the fourth vibration portion 50*d* may differ. For example, the orientations of the fillers of the third vibration portion 50*c* and the fourth vibration portion 50*d* may be perpendicular to each other, but aspects of the present disclosure are not limited thereto. For example, when an orientation of the filler of the third vibration portion 50*c* is 90 degrees, an orientation of the filler of the fourth vibration portion 50*d* may be 0 degrees. For example, when an orientation of the filler of the third vibration portion 50*c* is 0 degrees, an orientation of the filler of the fourth vibration portion 50*d* may be 90 degrees.

Because the vibration member 50 is provided, the vibration apparatus according to another aspect of the present disclosure may have substantially the same effect as an aspect of the present disclosure described above with reference to FIGS. 1 to 5.

Because the vibration member 50 includes the third vibration portion 50*c* and the fourth vibration portion 50*d* and the orientations of the fillers of the third vibration portion 50*c* and the fourth vibration portion 50*d* differ, the vibration apparatus according to another aspect of the present disclosure may easily adjust a resonance frequency of the vibration apparatus. Accordingly, the vibration apparatus according to another aspect of the present disclosure may more enhance a sound pressure level characteristic of a sound.

Figure 12:
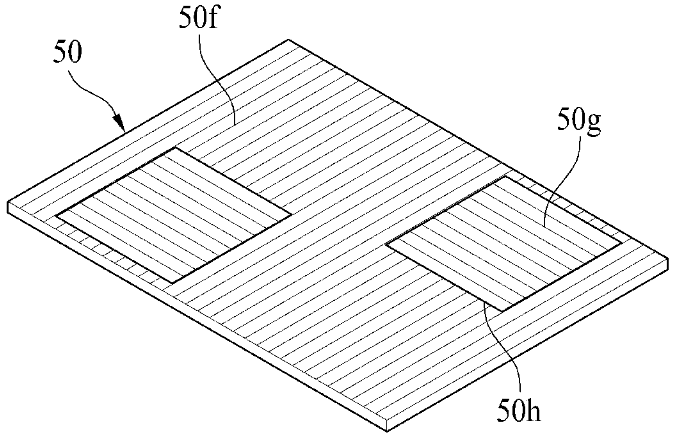
FIG. 12 illustrates a vibration member according to another aspect of the present disclosure.

FIG. 12 illustrates a vibration member according to another aspect of the present disclosure. Except for that the vibration member includes a fifth vibration portion and a sixth vibration portion, the vibration apparatus according to another aspect of the present disclosure may be the substantially same as the a vibration apparatus according to an aspect of the present disclosure described above with reference to FIGS. 1 to 5. Hereinafter, therefore, different elements will be described.

Referring to FIG. 12, a vibration member 50 according to another aspect of the present disclosure may include a fifth vibration portion 50*f* and a sixth vibration portion 50*g*. The fifth vibration portion 50*f* may include a plurality of accommodating portions (or inserting portions) 50*h* provided therein. Each of the plurality of accommodating portions (or inserting portions) 50*h* may be provided to pass through the fifth vibration portion 50*f*. The plurality of accommodating portions (or inserting portions) 50*h* may be disposed apart from one another by a certain separation distance in the fifth vibration portion 50*f*. For example, each of the plurality of accommodating portions (or inserting portions) 50*h* may be provided at a right upper end and a left upper end of the fifth vibration portion 50*f*. For example, each of the plurality of accommodating portions (or inserting portions) 50*h* may be provided at the left upper end and the right upper end of the fifth vibration portion 50*f*. However, aspects of the present disclosure are not limited thereto.

A plurality of sixth vibration portions 50*g* may be respectively accommodated (or inserted) into the plurality of accommodating portions (or inserting portions) 50*h* of the fifth vibration portion 50*f*. Each of the plurality of sixth vibration portions 50*g* and each of the plurality of accommodating portions (or inserting portions) 50*h* may have the same size. The number of sixth vibration portions 50*g* may be the same as the number of accommodating portions (or inserting portions) 50*h*. For example, when two accommodating portions (or inserting portions) 50*h* are provided, two sixth vibration portions 50*g* may be respectively accommodated (or inserted) into the two accommodating portions (or inserting portions) 50*h*.

The fifth vibration portion 50*f* and the plurality of sixth vibration portions 50*g* may include a material having an orientation. The fifth vibration portion 50*f* and the plurality of sixth vibration portions 50*g* may be fiber reinforced plastic having an orientation of a filler. The fifth vibration portion 50*f* and the plurality of sixth vibration portions 50*g* according to another aspect of the present disclosure may have different orientations. For example, orientations of fillers of the fifth vibration portion 50*f* and the plurality of sixth vibration portions 50*g* may differ. For example, the orientations of the fillers of the fifth vibration portion 50*f* and the plurality of sixth vibration portions 50*g* may be perpendicular to each other, but aspects of the present disclosure are not limited thereto. For example, when an orientation of the filler of the fifth vibration portion 50*f* is 90 degrees, an orientation of the filler of each of the plurality of sixth vibration portions 50*g* may be 0 degrees. For example, when an orientation of the filler of the fifth vibration portion 50$f$ is 0 degrees, an orientation of the filler of each of the plurality of sixth vibration portions 50$g$ may be 90 degrees.

Because the vibration member 50 is provided, the vibration apparatus according to another aspect of the present disclosure may have substantially the same effect as an aspect of the present disclosure described above with reference to FIGS. 1 to 5.

Because the vibration member 50 includes the fifth vibration portion 50$f$ and the sixth vibration portion 50$g$ and the orientations of the fillers of the fifth vibration portion 50$f$ and the sixth vibration portion 50$g$ differ, the vibration apparatus according to another aspect of the present disclosure may easily adjust a resonance frequency of the vibration apparatus and may easily adjust peak and/or dip. Accordingly, the vibration apparatus according to another aspect of the present disclosure may more enhance a sound pressure level characteristic of a sound.

Figure 13:
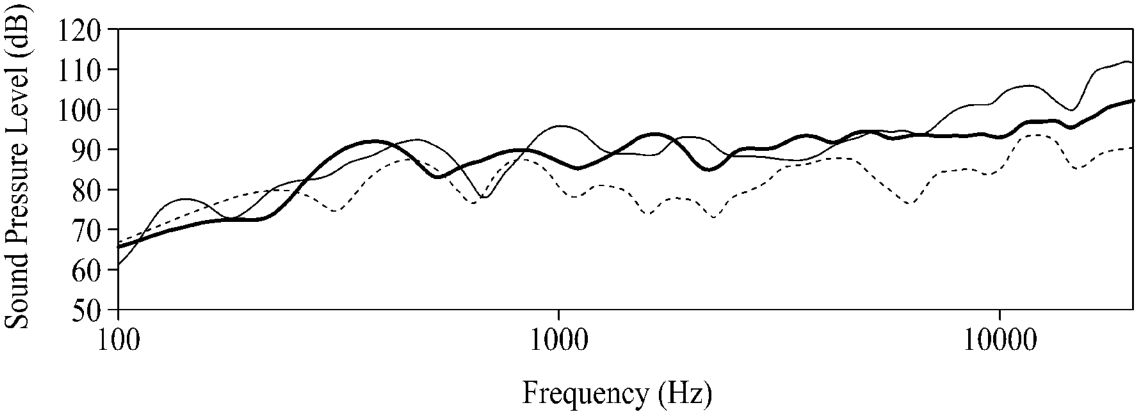
FIG. 13 illustrates a sound output characteristic of a vibration apparatus according to one or more aspects of the present disclosure.

FIG. 13 illustrates a sound output characteristic of a vibration apparatus according to one or more aspects of the present disclosure. In FIG. 13, the abscissa axis represents a frequency (hertz (Hz)), and the ordinate axis represents a sound pressure level (SPL) (decibel (dB)).

A sound output characteristic of an apparatus may be measured by a sound analysis apparatus. The sound analysis apparatus may include a sound card which transmits or receives a sound to or from a control personal computer (PC), an amplifier which amplifies a signal generated from the sound card and transfers the amplified signal to a vibration apparatus, and a microphone which collects a sound generated in a rear region of the apparatus on the basis of driving of the vibration apparatus. The sound collected through the microphone may be input to the control PC through the sound card, and a control program may check the input sound to analyze a peak response time of the apparatus.

A sound output characteristic has been measured in a half anechoic room. In measuring, an applied frequency signal has been applied as a sine sweep within a range of 150 Hz to 20 kHz, and ⅓ octave smoothing has been performed on a measurement result. A separation distance between an apparatus and a microphone is 30 cm. However, a measurement method of a sound output characteristic is not limited thereto.

In FIG. 13, a dotted line represents that a vibration apparatus has been manufactured by connecting a signal cable with a vibration generating part and respectively attaching an adhesive layer and a cover member on an upper surface and a lower surface of the vibration generating portion, and after the manufactured vibration apparatus is attached on a metal plate SUS by using an adhesive member, a sound output characteristic of the vibration generating part has been measured. A thickness of the attached metal plate SUS may be 0.5 mm. The thickness of the metal plate SUS does not limit details of the present disclosure. Hereinafter, a dotted line is referred to as an experiment example 1.

A thin solid line represents that a vibration apparatus has been manufactured like the experiment example 1, the manufactured vibration apparatus has been attached on heat-resistant PP by using an adhesive member, and a sound output characteristic of the vibration generating part has been measured. A thickness of the attached heat-resistant PP may be 3.0 mm. The thickness of the heat-resistant PP does not limit details of the present disclosure. Hereinafter, a thin solid line is referred to as an experiment example 2.

A thick solid line represents a sound output characteristic of a vibration generating part in the vibration apparatus according to an aspect of the present disclosure described above with reference to FIGS. 1 to 5. In an aspect of the present disclosure, a vibration member may perform a function of a passive vibration member, and thus, the thick solid line represents that a sound output characteristic of a vibration generating part according to an aspect of the present disclosure, which is not attached on a separate passive vibration member, has been measured. A thickness of the vibration member may be 0.22 mm. The thickness of the vibration member does not limit details of the present disclosure. Hereinafter, a thick solid line is referred to as an aspect 1.

The following Table 2 shows an average sound pressure level with respect to a frequency range of each of the experiment example 1, the experiment example 2, and the aspect 1 of the present disclosure.

TABLE 2

| | | Experiment Example 1 | Experiment Example 2 | Aspect 1 |
|---|---|---|---|---|
| Sound Pressure Level (dB) | 0.3 kHz~1 kHz | 83.0 | 87.9 | 88.4 |
| | 1 kHz~4 kHz | 79.7 | 90.1 | 89.7 |
| | 4 kHz~8 kHz | 83.1 | 94.3 | 93.3 |
| | 8 kHz~12 kHz | 87.4 | 103.1 | 94.3 |

Referring to FIG. 13 and Table 2, a vibration apparatus according to the experiment example 1 of the present disclosure has an average sound pressure level of about 83.0 dB in 0.3 kHz to 1 kHz, an average sound pressure level of about 79.7 dB in 1 kHz to 4 kHz, an average sound pressure level of about 83.1 dB in 4 kHz to 8 kHz, and an average sound pressure level of about 87.4 dB in 8 kHz to 12 kHz. Therefore, the vibration apparatus according to the experiment example 1 of the present disclosure has a sound pressure level characteristic of 79.7 dB or more in 0.3 kHz to 12 kHz. Accordingly, it may be seen that the experiment example 1 has a sound pressure level characteristic which is lower than the experiment example 2 and the aspect 1.

A vibration apparatus according to the experiment example 2 of the present disclosure has an average sound pressure level of about 87.9 dB in 0.3 kHz to 1 kHz, an average sound pressure level of about 90.1 dB in 1 kHz to 4 kHz, an average sound pressure level of about 94.3 dB in 4 kHz to 8 kHz, and an average sound pressure level of about 103.1 dB in 8 kHz to 12 kHz. Therefore, the vibration apparatus according to the experiment example 2 of the present disclosure has a sound pressure level characteristic of 87.9 dB or more in 0.3 kHz to 12 kHz. Accordingly, it may be seen that the experiment example 2 has a sound pressure level characteristic which is higher than the experiment example 1 and has a sound pressure level characteristic which is lower than the aspect 1.

A vibration apparatus according to the aspect 1 of the present disclosure has an average sound pressure level of about 88.4 dB in 0.3 kHz to 1 kHz, an average sound pressure level of about 89.7 dB in 1 kHz to 4 kHz, an average sound pressure level of about 93.3 dB in 4 kHz to 8 kHz, and an average sound pressure level of about 94.3 dB in 8 kHz to 12 kHz. Therefore, the vibration apparatus according to the aspect 1 of the present disclosure has a sound pressure level characteristic of 88.4 dB or more in 0.3 kHz to 12 kHz. Accordingly, it may be seen that the aspect 1 of the present disclosure has a sound pressure level characteristic which is higher than the experiment example 1 and the experiment example 2 in 0.3 kHz to 12 kHz.

Therefore, in the vibration apparatus according to an aspect of the present disclosure, a vibration member which has a low density and a high Young's modulus and includes thermo-curable plastic having a semi-cured state may be provided, and thus, a vibration apparatus which decreases in thickness and weight and is good in heat resistance may be provided and a sound pressure level characteristic of the vibration apparatus may be enhanced.

Moreover, according to an aspect of the present disclosure, a thickness of a vibration apparatus may be reduced, and thus, a weight of the vibration apparatus may decrease, thereby implementing a lightweight vibration apparatus. Also, in an aspect of the present disclosure, a manufacturing process may be simplified, and thus, process optimization may be implemented by reducing production energy.

According to an aspect of the present disclosure, a vibration member which has a low density and a high Young's modulus and includes plastic may be provided, and thus, a sound pressure level characteristic of a vibration apparatus may be enhanced and peak and/or dip may be improved.

Figure 14:
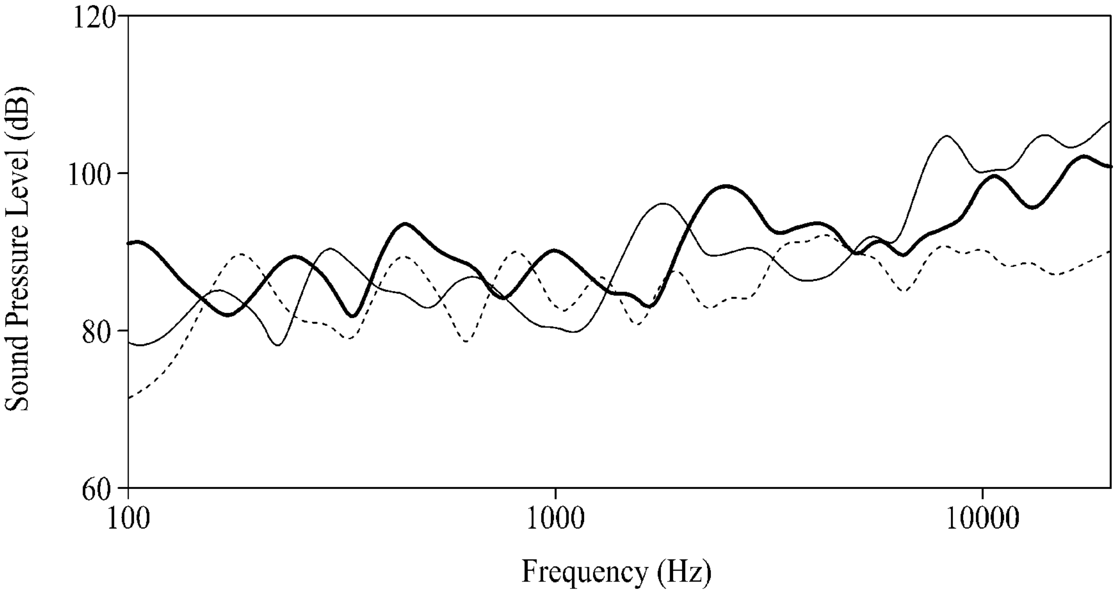
FIG. 14 illustrates a sound output characteristic of a vibration apparatus according to one or more aspects of the present disclosure.

FIG. 14 illustrates a sound output characteristic of a vibration apparatus according to one or more aspects of the present disclosure. In FIG. 14, the abscissa axis represents a frequency (hertz (Hz)), and the ordinate axis represents a sound pressure level (SPL) (decibel (dB)). Also, a sound output characteristic according to some aspects of the present disclosure may be measured by the same apparatus as FIG. 13, and thus, only different elements will be described below.

In FIG. 14, a dotted line represents a result obtained by measuring a sound output of a vibration apparatus which has been manufactured like the experiment example 1 of FIG. 13. Hereinafter, a dotted line is referred to as the experiment example 1.

A thin solid line represents that a vibration apparatus has been manufactured like the experiment example 1, the manufactured vibration apparatus has been attached on heat-resistant PP by using an adhesive member, and a sound output characteristic of a vibration generating part has been measured. Here, a thickness of the attached heat-resistant PP may be 0.5 mm. Hereinafter, a thin solid line is referred to as an experiment example 3.

A thick solid line represents a result obtained by measuring a sound output characteristic of a vibration generating part in the vibration apparatus according to an aspect of the present disclosure described above with reference to FIGS. 1 to 5, and in this case, a thickness of a vibration member has been set to 0.5 mm like a metal plate and PP. Hereinafter, a thick solid line is referred to as an aspect 2. For example, thicknesses of vibration members of the experiment example 1, the experiment example 3, and the aspect 2 have been set to be equal to one another.

The following Table 3 shows an average sound pressure level and a standard deviation with respect to a frequency range of 0.3 kHz to 8 kHz in each of the experiment example 1, an experiment example 3, and an aspect 2 according to the present disclosure.

TABLE 3

| | Experiment Example 1 | Experiment Example 3 | Aspect 2 |
|---|---|---|---|
| Average Sound Pressure Level (dB) | 86.0 | 88.2 | 89.9 |
| Standard Deviation | 3.5 | 5.2 | 4.1 |

Referring to FIG. 14 and Table 3, a vibration apparatus according to the experiment example 1 may have an average sound pressure level of about 86.0 dB in 0.3 kHz to 8 kHz. A vibration apparatus according to the experiment example 3 may have an average sound pressure level of about 88.2 dB in 0.3 kHz to 8 kHz. A vibration apparatus according to the aspect 2 of the present disclosure may have an average sound pressure level of about 89.9 dB in 0.3 kHz to 8 kHz. For example, a vibration apparatus may have a sound characteristic which is good as an average sound pressure level increases. Accordingly, in a case where a vibration apparatus is manufactured to have the same thickness and a sound pressure level is measured, it may be seen that an average sound pressure level of the aspect 2 has a value which is higher than the experiment example 1 and the experiment example 3.

It may be seen that standard deviations of sound pressure levels of the experiment example 1, the experiment example 3, and the aspect 2 of the present disclosure are 3.5, 5.2, and 4.1, respectively. In a standard deviation, a vibration apparatus may have a sound characteristic which is good as an average sound pressure level decreases. It may be seen that a standard deviation of a sound pressure level of the aspect 2 of the present disclosure is measured to be higher than the experiment example 1 and lower than the experiment example 3. Here, comparing with the experiment example 3, because a separate adhesive member which is heavy in weight is needed in the experiment example 3, the aspect 2 of the present disclosure may decrease a thickness and a weight and may enhance a sound pressure level characteristic of a vibration apparatus.

Therefore, in the vibration apparatus according to an aspect of the present disclosure, a vibration member which has a low density and a high Young's modulus and includes thermo-curable plastic having a semi-cured state may be provided, thereby providing a vibration apparatus where a thickness and a weight decrease compared to a case where a vibration member includes a metal plate, and a thickness decreases and a heat resistance is good compared to a case where a vibration member includes PP. Also, in an aspect of the present disclosure, a thickness of a vibration apparatus may decrease, and a sound pressure level characteristic of the vibration apparatus may be enhanced. Also, in an aspect of the present disclosure because a thickness of the vibration apparatus decreases, a weight of the vibration apparatus may be reduced, and thus, a lightweight vibration apparatus may be implemented.

According to an aspect of the present disclosure, a vibration member which has a low density and a high Young's modulus and includes plastic may be provided, and thus, a sound pressure level characteristic of a vibration apparatus may be enhanced and peak and/or dip may be improved. According to an aspect of the present disclosure, because a vibration apparatus includes a vibration member which has a low density and a high Young's modulus and includes plastic, a sound pressure level characteristic of the vibration apparatus may be enhanced, and peak and/or dip may be improved.

Figure 15:
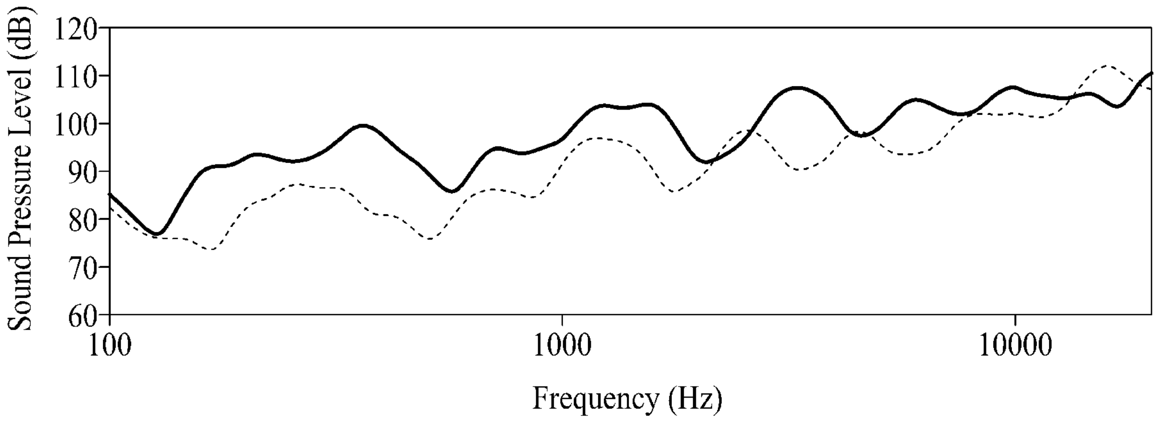
FIG. 15 illustrates a sound output characteristic of a vibration apparatus according to one or more aspects of the present disclosure.
Figure 16:
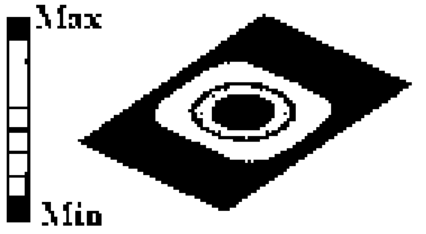
FIG. 16 illustrates a sound output simulation result of a vibration apparatus according to one or more aspects of the present disclosure.
Figure 16:
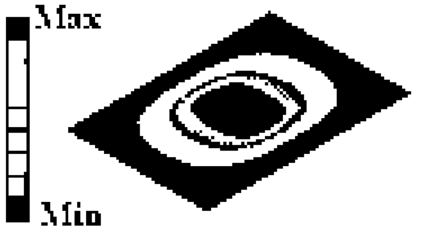
Figure 16:
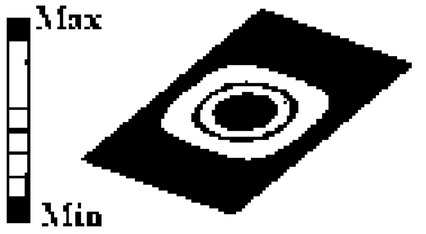
Figure 16:
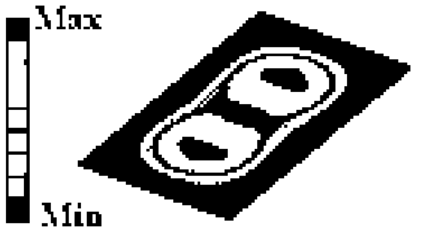
Figure 16:
Figure 16:
Figure 16:
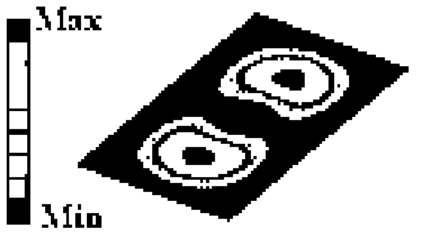
Figure 16:
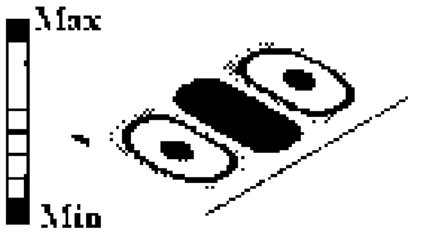
Figure 16:
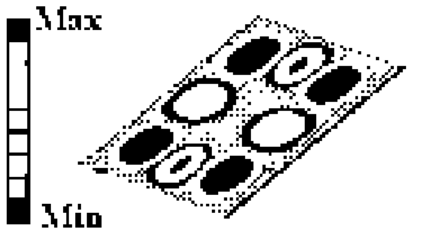
Figure 16:
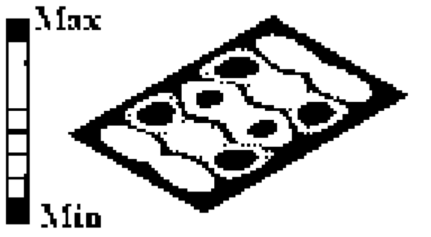
Figure 16:
Figure 16:

FIG. 15 illustrates a sound output characteristic of a vibration apparatus according to one or more aspects of the present disclosure. In FIG. 15, the abscissa axis represents a frequency (hertz (Hz)), and the ordinate axis represents a sound pressure level (SPL) (decibel (dB)). Also, a sound output characteristic according to some aspects of the present disclosure may be measured by the same apparatus as FIG. 13, and thus, only different elements will be described below. FIG. 16 illustrates a sound output simulation result of a vibration apparatus according to one or more aspects of the present disclosure. A sound output simulation represents a simulation of a harmonic response analysis for vibration analysis. FIG. 16 shows data for checking a deformation of stress with respect to colors.

In FIG. 15, a dotted line and a thick solid line represent that a sound output characteristic of a vibration generating part in a vibration apparatus according to an aspect of the present disclosure described above with reference to FIGS. 6 to 8 has been measured, and a thickness of the vibration member has been 0.5 mm. The thickness of the vibration member does not limit details of the present disclosure.

In the dotted line, in a state where an orientation of a filler of each of a first vibration plate and a third vibration plate is 0 degrees and an orientation of a filler of a second vibration plate is 90 degrees, the orientation of the filler of each of the first vibration plate and the third vibration plate and the orientation of the filler of the second vibration plate are tilted by a certain angle in different directions. For example, the certain angle may be 45 degrees-(−45 degrees)-45 degrees. Hereinafter, the dotted line is referred to as the aspect 3.

In the thick solid line, the orientation of the filler of each of the first vibration plate and the third vibration plate is 0 degrees and the orientation of the filler of the second vibration plate is 90 degrees. Hereinafter, the thick solid line is referred to as an aspect 4.

Referring to FIG. 15, a vibration apparatus according to the aspect 3 of the present disclosure may have an average sound pressure level of about 89.9 dB in 0.3 kHz to 8 kHz. A vibration apparatus according to an aspect 4 may have an average sound pressure level of about 90.0 dB in 0.3 kHz to 8 kHz. For example, a vibration apparatus may have a sound characteristic which is good as an average sound pressure level increases. Accordingly, a sound pressure level characteristic of the aspect 4 of the present disclosure is greater in value than a sound pressure level characteristic of the aspect 3.

Referring to FIG. 16, a stress may concentrate toward red from blue. As a stress concentrates, a sound pressure level may increase, and the flatness of a sound pressure level may be reduced. In an aspect of the present disclosure, a stress of a desired pitched sound band may be adjusted based on an orientation of a filler, and thus, the flatness of a sound pressure level and/or a sound pressure level of a specific pitched sound band may be adjusted.

For example, in the aspect 3 (45 degrees-(−45 degrees)-45 degrees), blue concentrates on a center portion in 10 Hz, and red concentrates on an outer portion. In the aspect 3, in 11.66 Hz, green concentrates on the center portion, red concentrates on a left portion and a right portion with respect to green, and blue concentrates on the outer portion. In the aspect 3, a ratio of blue and red decreases progressively toward 100 Hz from 21.55 Hz, the most of blue and red disappear in 1 kHz, and a ratio of green is high. Therefore, in the aspect 3, it may be seen that the flatness of a sound pressure level is low in 10 Hz, 11.66 Hz, and 21.55 Hz, and the flatness of a sound pressure level increases progressively toward 36.88 Hz, 100 Hz, and 1 kHz. For example, the flatness of a sound pressure level may be a difference between a highest sound pressure level and a lowest sound pressure level occurring in a reproduction frequency band.

For example, the aspect 4 (0 degrees-(90 degrees)-0 degrees), blue concentrates on a center portion in 10 Hz, 11.66 Hz, and 21.56 Hz, and red concentrates on an outer portion. In the aspect 4, a ratio of blue and red decreases progressively toward 100 Hz from 21.55 Hz, and a ratio of green is higher than a ratio of blue and red in 1 kHz. Therefore, in the aspect 4, it may be seen that the flatness of a sound pressure level is low in 10 Hz, 11.66 Hz, and 21.55 Hz, and the flatness of a sound pressure level increases progressively toward 36.88 Hz, 100 Hz, and 1 kHz.

Therefore, according to an aspect of the present disclosure, it may be seen that the aspect 3 and the aspect 4 have a uniform sound pressure level characteristic toward 1 kHz from 10 Hz, based on a simulation result. For example, in the sound pressure level characteristic of the aspect 3 and the aspect 4, it may be seen that a stress is dispersed and thus the flatness of a sound pressure level is improved toward 1 kHz from 10 Hz. According to an aspect of the present disclosure, a division vibration may occur as a frequency increases, and a stress may be dispersed in a whole region of a vibration member, whereby a strong stress may decrease. For example, when a strong stress concentrates on a small region, for example, a vibration member may have a high sound pressure level in 10 Hz. Also, based on the simulation result of each of the aspect 3 and the aspect 4, in an aspect of the present disclosure, it may be seen that a resonance point of a vibration apparatus is adjusted and a vibration characteristic of the vibration apparatus is adjusted by adjusting a frequency.

According to one or more aspects of the present disclosure, in a case where a vibration member includes a plurality of first vibration portions and a second vibration portion and orientations of fillers of the plurality of first vibration portions and the second vibration portion differ, a vibration apparatus may have a sound pressure level which is better than a case where orientations are equal to one another.

Figure 17:
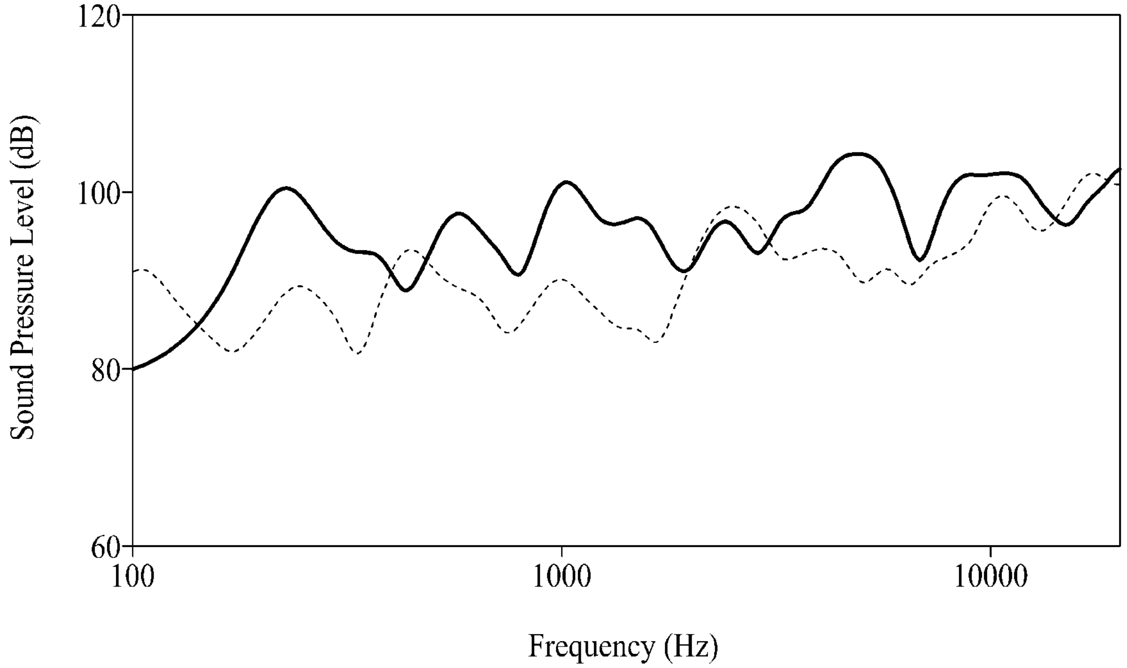
FIG. 17 illustrates a sound output characteristic of a vibration apparatus according to one or more aspects of the present disclosure.

FIG. 17 illustrates a sound output characteristic of a vibration apparatus according to one or more aspects of the present disclosure. In FIG. 17, the abscissa axis represents a frequency (hertz (Hz)), and the ordinate axis represents a sound pressure level (SPL) (decibel (dB)). Also, a sound output characteristic according to one or more aspects of the present disclosure may be measured by the same apparatus as FIG. 13, and thus, only different elements will be described below.

In FIG. 17, a dotted line and a thick solid line represent that a sound output characteristic of a vibration generating part in a vibration apparatus according to an aspect of the present disclosure described above with reference to FIGS. 6 to 8 has been measured, and a thickness of the vibration member has been 0.5 mm. The thickness of the vibration member does not limit details of the present disclosure.

In the dotted line, in a state where an orientation of a filler of each of a first vibration plate and a third vibration plate is 0 degrees and an orientation of a filler of a second vibration plate is 90 degrees, the orientation of the filler of each of the first vibration plate and the third vibration plate and the orientation of the filler of the second vibration plate are tilted by a certain angle in different directions. For example, the certain angle may be 45 degrees-(−45 degrees)-45 degrees. The dotted line may be the same as the dotted line described above with reference to FIGS. 15 and 16, and thus, the dotted line is referred to as the aspect 3.

In the thick solid line, the orientation of the filler of each of the first vibration plate and the third vibration plate is 90 degrees and the orientation of the filler of the second vibration plate is 90 degrees. Hereinafter, the thick solid line is referred to as an aspect 5.

The following Table 4 shows an average sound pressure level and a standard deviation with respect to a frequency range of 0.3 kHz to 8 kHz of each of the aspect 3 and the aspect 5 according to the present disclosure.

TABLE 4

| | Aspect 3 | Aspect 5 |
|---|---|---|
| Average Sound Pressure Level (dB) | 89.9 | 96.1 |
| Standard Deviation | 4.1 | 3.8 |

Referring to FIG. 17, a vibration apparatus according to the aspect 3 of the present disclosure may have an average sound pressure level of about 89.9 dB in 0.3 kHz to 8 kHz. A vibration apparatus according to the aspect 5 of the present disclosure may have an average sound pressure level of about 96.1 dB in 0.3 kHz to 8 kHz. For example, a vibration apparatus may have a sound characteristic which is good as an average sound pressure level increases. Accordingly, a sound pressure level of the aspect 5 of the present disclosure has a value which is higher than a sound pressure level of the aspect 3 of the present disclosure. For example, the aspect 5 has a sound pressure level characteristic which is higher than the aspect 3, like the aspect 4 described above with reference to FIGS. 15 and 16.

Standard deviations of sound pressure levels of the experiment example 3 and the aspect 5 of the present disclosure are 4.1 and 3.8, respectively. In a standard deviation, a vibration apparatus may have a sound characteristic which is good as an average sound pressure level decreases. It may be seen that a standard deviation of a sound pressure level of the aspect 5 of the present disclosure has a value which is less than the aspect 3. Accordingly, it may be seen that a sound pressure level of the aspect 5 is better than the aspect 3.

Figure 18A:
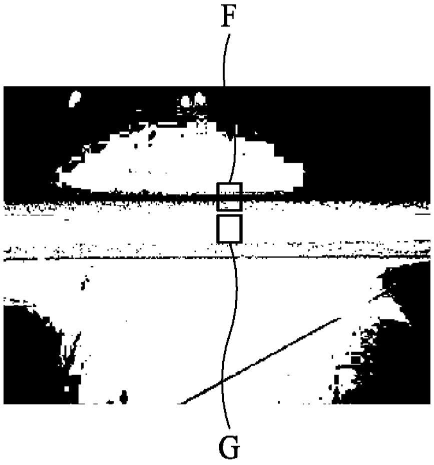
FIGS. 18A to 18C illustrate a cross-sectional image of a vibration member according to one or more aspects of the present disclosure.
Figure 18B:
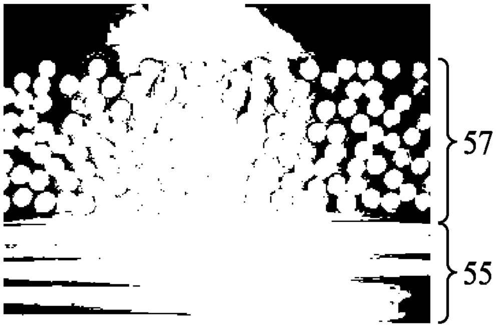
Figure 18C:

FIGS. 18A to 18C illustrate cross-sectional images of a vibration member according to one or more aspects of the present disclosure.

Referring to FIGS. 18A to 18C, a cross-sectional surface of a vibration member according to another aspect of the present disclosure represents a cross-sectional image of a vibration member including first to fourth vibration plates 51 to 57 which are sequentially stacked. FIGS. 18B and 18C shown a magnification of 10 times the cross-sectional image of the vibration member of FIG. 18A. FIG. 18B shows the enlargement of a region F of FIG. 18A. FIG. 18C shows the enlargement of a region G of FIG. 18A.

In a vibration member according to another aspect of the present disclosure, orientations of fillers of the first vibration plate 51 and the fourth vibration plate 57 may be equal to each other, and orientations of fillers of the second vibration plate 53 and the third vibration plate 55 provided between the first vibration plate 51 and the fourth vibration plate 57 may be equal to each other. For example, the first and fourth vibration plates 51 and 57 and the second and third vibration plates 53 and 55 may have different orientations. For example, the first and fourth vibration plates 51 and 57 and the second and third vibration plates 53 and 55 may have different orientations vertical to each other. For example, when the orientations of the fillers of the first vibration plate 51 and the fourth vibration plate 57 are 0 degrees, the second and third vibration plates 53 and 55 may be 90 degrees. Accordingly, the first vibration plate 51 and the fourth vibration plate 57 may have orientations of fillers which are aligned in a vertical direction from a first surface (or a lower surface) of the vibration member. Therefore, the second vibration plate 53 and the third vibration plate 55 provided between the first vibration plate 51 and the fourth vibration plate 57 may have orientations of fillers which are aligned in a horizontal direction from the first surface (or the lower surface) of the vibration member.

Figure 19:
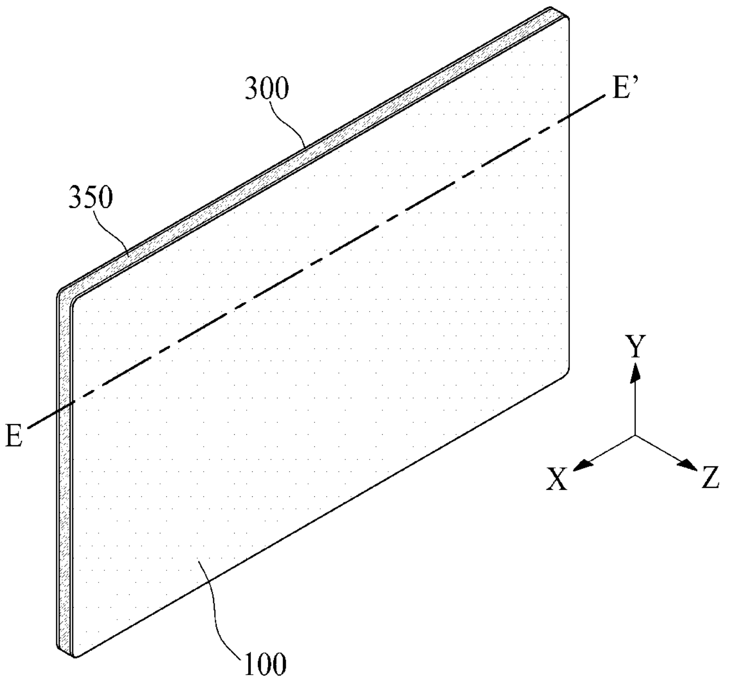
FIG. 19 illustrates an apparatus according to an aspect of the present disclosure.
Figure 20:
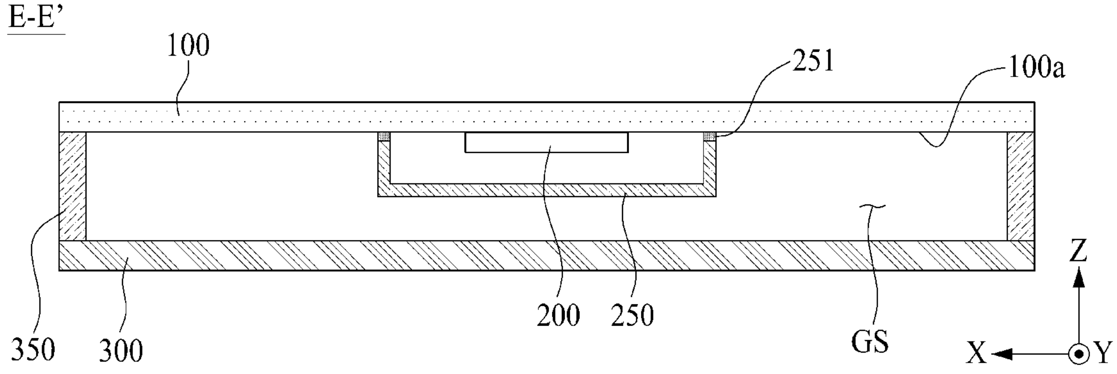
FIG. 20 is a cross-sectional view taken along line E-E' illustrated in FIG. 19 according to an aspect of the present disclosure.

FIG. 19 illustrates an apparatus according to an aspect of the present disclosure. FIG. 20 is a cross-sectional view taken along line E-E' illustrated in FIG. 19 according to an aspect of the present disclosure.

Referring to FIGS. 19 and 20, an apparatus according to an aspect of the present disclosure may include a passive vibration member 100 and one or more vibration generating apparatuses 200.

The apparatus according to an aspect of the present disclosure may be a display apparatus, a sound apparatus, a sound generating apparatus, a sound bar, an analog signage, or a digital signage, or the like, but aspects of the present disclosure are not limited thereto.

The display apparatus may include a display panel including a plurality of pixels which implement a black/white or color image and a driver for driving the display panel. An image according to an aspect of the present disclosure may include an electronic image, a digital image, a still image, or a video image, but aspects of the present disclosure are not limited thereto. For example, the display panel may be an organic light emitting display panel, a light emitting diode display panel, an electrophoresis display panel, an electrowetting display panel, a micro light emitting diode display panel, or a quantum dot light emitting display panel, or the like, but aspects of the present disclosure are not limited thereto. For example, in the organic light emitting display panel, a pixel may include an organic light emitting device such as an organic light emitting layer or the like, and the pixel may be a subpixel which implements any one of a plurality of colors configuring a color image. Therefore, an apparatus according to an aspect of the present disclosure may include a set device (or a set apparatus) or a set electronic device such as a notebook computer, a television (TV), a computer monitor, an equipment apparatus including an automotive apparatus or another type apparatus for vehicles, or a mobile electronic device such as a smartphone, or an electronic pad, or the like which is a complete product (or a final product) including a display panel such as an organic light emitting display panel, a liquid crystal display panel, or the like.

The analog signage may be an advertising signboard, a poster, a noticeboard, or the like. The analog signage may include content such as a sentence, a picture, and a sign, or the like. The content may be disposed at the passive vibration member 100 of the apparatus to be visible. For example, the content may be directly attached on the passive vibration member 100 and the content may be printed or the like on a medium such as paper, and the medium may be attached on the passive vibration member 100.

The passive vibration member 100 may vibrate based on driving (or vibration) of the one or more vibration generating apparatuses 200. For example, the passive vibration member 100 may generate one or more of a vibration and a sound based on driving of the one or more vibration generating apparatuses 200.

The passive vibration member 100 according to an aspect of the present disclosure may be a display panel including a display area (or a screen) having a plurality of pixels which implement a black/white or color image. Thus, the passive vibration member 100 may generate one or more of a vibration and a sound based on driving of the one or more vibration generating apparatuses 200. For example, the passive vibration member 100 may vibrate based on a vibration of the vibration generating apparatus 200 while a display area is displaying an image, and thus, may generate or output a sound synchronized with the image displayed on the display area. For example, the passive vibration member 100 according to an aspect of the present disclosure may be a vibration object, a display member, a display panel, a signage panel, a passive vibration plate, a front cover, a front member, a vibration panel, a sound panel, a passive vibration panel, a sound output plate, a sound vibration plate, or a video screen, but aspects of the present disclosure are not limited thereto.

According to another aspect of the present disclosure, the passive vibration member 100 may be a vibration plate including a metal material or a nonmetal material (or a complex nonmetal material), which has a material characteristic suitable for outputting a sound based on a vibration of each of the one or more vibration generating apparatuses 200. For example, the passive vibration member 100 may be a vibration plate including one or more materials of metal, plastic, paper, fiber, cloth, wood, leather, rubber, glass, carbon, and mirror. For example, the paper may be a cone paper for speakers. For example, the cone paper may be pulp or foam plastic, but aspects of the present disclosure are not limited thereto.

The passive vibration member 100 according to another aspect of the present disclosure may include a display panel including a pixel displaying an image, or may include a non-display panel. For example, the passive vibration member 100 may include one or more of a display panel including a pixel configured to display an image, a screen panel on which an image is to be projected from a display apparatus, a lighting panel, a light emitting diode lighting panel, an organic light emitting lighting panel, an inorganic light emitting lighting panel, a signage panel, a vehicular interior material, a vehicular exterior material, a vehicular glass window, a vehicular seat interior material, a ceiling material of a building, an interior material of a building, a glass window of a building, an interior material of an aircraft, a glass window of an aircraft, and mirror, but aspects of the present disclosure are not limited thereto. For example, the non-display panel may be a light emitting diode lighting panel (or apparatus), an organic light emitting diode lighting panel (or apparatus), or an inorganic light emitting diode lighting panel (or apparatus), but aspects of the present disclosure are not limited thereto.

The one or more vibration generating apparatuses 200 may be configured to vibrate the passive vibration member 100. The one or more vibration generating apparatuses 200 may be configured to be connected with a rear surface 100*a* of the passive vibration member 100 without a connection member. The one or more vibration generating apparatuses 200 may be configured to be directly connected to a rear surface 100*a* of the passive vibration member 100. Accordingly, the one or more vibration generating apparatuses 200 may vibrate the passive vibration member 100, and thus, may generate or output one or more of a vibration and a sound, based on a vibration of the passive vibration member 100.

The one or more vibration generating apparatuses 200 may include one or more of the vibration apparatuses described above with reference to FIGS. 1 to 18. Accordingly, the descriptions of the vibration apparatuses illustrated in FIGS. 1 to 18 may be included in descriptions of vibration apparatuses illustrated in FIGS. 19 to 20, and thus, like reference numerals refer to like elements and repetitive descriptions thereof are omitted.

The apparatus according to an aspect of the present disclosure may further include a supporting member 300 and a coupling member 350.

The supporting member 300 may be disposed on the rear surface 100*a* of the passive vibration member 100. The supporting member 300 may be disposed on the rear surface 100*a* of the passive vibration member 100 to cover the vibration generating apparatus 200. The supporting member 300 may be disposed on the rear surface 100*a* of the passive vibration member 100 to cover all of the rear surface 100*a* of the passive vibration member 100 and the vibration generating apparatus 200. For example, the supporting member 300 may have a size which is equal to that of the passive vibration member 100. For example, the supporting member 300 may cover the rear surface 100*a* of the passive vibration member 100 with the vibration generating apparatus 200 and a gap space GS therebetween. For example, the supporting member 300 may cover the whole rear surface 100*a* of the passive vibration member 100 with the vibration generating apparatus 200 and the gap space GS therebetween. The gap space GS provided by the coupling member 350 may be disposed between the passive vibration member 100 and the supporting member 300 facing each other. The gap space GS may be referred to as an air gap, an accommodating space, a vibration space, and a sound sounding box, but aspects of the present disclosure are not limited thereto.

The supporting member 300 may include one or more materials of a glass material, a metal material, and a plastic material. The supporting member 300 may have a stack structure where one or more materials of a glass material, a metal material, and a plastic material are stacked. For example, a supporting member 300 may include a plastic material and a filler. For example, the plastic material may be fiber reinforced plastic.

Each of the passive vibration member 100 and the supporting member 300 may have a square shape or a rectangular shape, but aspects of the present disclosure are not limited thereto. For example, each of the passive vibration member 100 and the supporting member 300 may have a polygonal shape, a non-polygonal shape, a circular shape, or an oval shape. For example, in a case where the apparatus according to an aspect of the present disclosure is applied to a sound apparatus or a sound bar, each of the passive vibration member 100 and the supporting member 300 may have a rectangular shape where a long-side length is twice or longer than a short-side length, but aspects of the present disclosure are not limited thereto.

The coupling member 350 may be configured to be connected between a rear edge portion of the passive vibration member 100 and a front edge portion of the supporting member 300, and thus, the gap space GS may be provided between the passive vibration member 100 and the supporting member 300 facing each other.

The coupling member 350 according to an aspect of the present disclosure may include an elastic material which has adhesive properties and is capable of compression and decompression. For example, the coupling member 350 may include a double-side tape, a single-sided tape, or a double-side adhesive foam pad, but aspects of the present disclosure are not limited thereto. For example, the coupling member 350 may include an elastic pad such as a rubber pad or a silicone pad, which has adhesive properties and is capable of compression and decompression. For example, the coupling member 350 may include an elastomer.

As another example, the supporting member 300 may further include a sidewall portion which supports the rear edge portion of the passive vibration member 100. The sidewall portion of the supporting member 300 may protrude or be bent toward the rear edge portion of the passive vibration member 100 from the front edge portion of the supporting member 300, and thus, the gap space GS may be provided between the passive vibration member 100 and the supporting member 300. In this case, the coupling member 350 may be configured to be connected between the sidewall portion of the supporting member 300 and the rear edge portion of the passive vibration member 100. Accordingly, the supporting member 300 may cover the one or more vibration generating apparatuses 200 and may support the rear surface 100*a* of the passive vibration member 100. For example, the supporting member 300 may cover the one or more vibration generating apparatuses 200 and may support the rear edge portion of the passive vibration member 100.

As another example, the passive vibration member 100 may further include a sidewall portion which is connected with the front edge portion of the supporting member 300. The sidewall portion of the passive vibration member 100 may protrude or be bent toward the front edge portion of the supporting member 300 from the rear edge portion of the passive vibration member 100, and thus, the gap space GS may be provided between the passive vibration member 100 and the supporting member 300. The passive vibration member 100 may increase in stiffness, based on the sidewall portion thereof. In this case, the coupling member 350 may be configured to be connected between the sidewall portion of the passive vibration member 100 and the rear edge portion of the supporting member 300. Accordingly, the supporting member 300 may cover the one or more vibration generating apparatuses 200 and may support the rear surface 100*a* of the passive vibration member 100. For example, the supporting member 300 may cover the one or more vibration generating apparatuses 200 and may support the rear edge portion of the passive vibration member 100.

For example, a vibration generating apparatus 200 may include a vibration member, a vibration generating portion, an adhesive layer, and a cover member.

The apparatus according to an aspect of the present disclosure may further include one or more enclosures 250.

The enclosure 250 may be connected or coupled to the rear edge portion of the passive vibration member 100 to individually cover the one or more vibration generating apparatuses 200. For example, the enclosure 250 may be connected or coupled to the rear surface 100*a* of the passive vibration member 100 by using a coupling member 251. The enclosure 250 may configure a sealing space, which covers or surrounds the one or more vibration generating apparatuses 200, in the rear surface 100*a* of the passive vibration member 100. For example, the enclosure 250 may be a sealing member, a sealing gap, a sealing box, or a sound box, but aspects of the present disclosure are not limited thereto. The sealing space may be an air gap, a vibration space, a sound space, or a sounding box, but aspects of the present disclosure are not limited thereto.

The enclosure 250 may include one or more materials of a metal material and a nonmetal material (or a complex nonmetal material). For example, the enclosure 250 may include one or more materials of metal, plastic, and wood, but aspects of the present disclosure are not limited thereto. For example, an enclosure 250 may include the same material as that of the vibration member described above with reference to FIGS. 1 to 5. For example, the enclosure 250 may include a plastic material and a filler. For example, the plastic material may be fiber reinforced plastic.

The enclosure 250 according to an aspect of the present disclosure may intactly maintain an impedance component based on air acting on the passive vibration member 100 when the passive vibration member 100 or the vibration generating apparatus 200 vibrates. For example, air around the passive vibration member 100 may resist to a vibration of the passive vibration member 100 and may act as an impedance component having a resistance and a reactance component, which vary based on a frequency. Accordingly, the enclosure 250 may configure a sealing space, which surrounds the one or more vibration generating apparatuses 200, in the rear surface 100*a* of the passive vibration member 100, and thus, may intactly maintain an impedance component (or an air impedance or an elastic impedance) acting on the passive vibration member 100 with air, thereby enhancing a sound characteristic and/or a sound pressure level characteristic of a low pitched sound band and the sound quality of a high pitched sound band.

Figure 21:
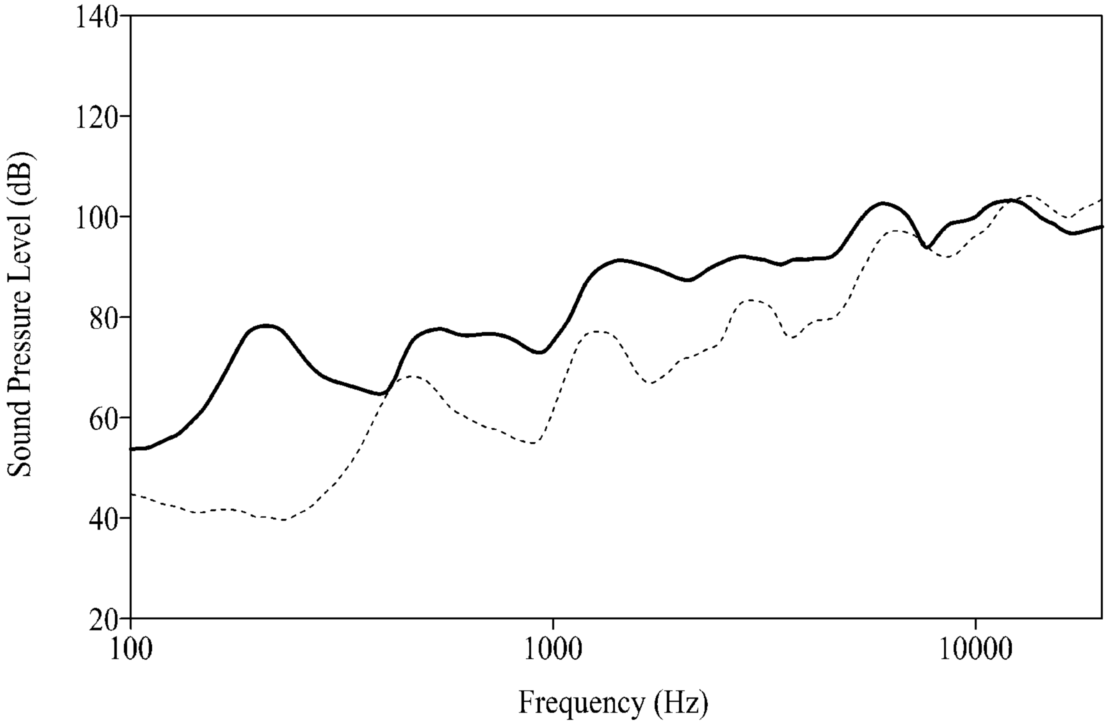
FIG. 21 illustrates a sound output characteristic of an apparatus according to an aspect of the present disclosure.

FIG. 21 illustrates a sound output characteristic of an apparatus according to an aspect of the present disclosure. In FIG. 21, the abscissa axis represents a frequency hertz ((Hz)), and the ordinate axis represents a sound pressure level (SPL) (decibel (dB)). Also, a sound output characteristic according to one or more aspects of the present disclosure may be measured by the same apparatus as FIG. 13, and thus, only different elements will be described below.

In FIG. 21, a dotted line represents that a sound output has been measured after the vibration apparatus described above with reference to FIGS. 19 and 20 is attached on a passive vibration member by using an adhesive member. Hereinafter, the dotted line is referred to as an aspect 6. A thick solid line represents that a sound output has been measured after the vibration apparatus described above with reference to FIGS. 19 and 20 is directly attached on a passive vibration member without using an adhesive member, and shows a result obtained by measuring a sound output of an apparatus on which a vibration apparatus and a passive vibration member are directly attached. Hereinafter, the thick solid line is referred to as an aspect 7. Also, in an aspect 6 and an aspect 7, an enclosure is provided at a rear surface of a vibration apparatus.

The following Table 5 shows an average sound pressure level with respect to a frequency range of each of the aspect 6 and the aspect 7 according to the present disclosure.

TABLE 5

| | | Aspect 6 | Aspect 7 |
|---|---|---|---|
| Sound Pressure Level (dB) | 0.3 kHz~1 kHz | 59.5 | 73.0 |
| | 1 kHz~4 kHz | 74.6 | 85.4 |
| | 4 kHz~8 kHz | 89.4 | 95.3 |
| | 8 kHz~12 kHz | 96.1 | 102.3 |

Referring to FIG. 21 and Table 5, a vibration apparatus according to the aspect 6 of the present disclosure has an average sound pressure level of about 59.5 dB in 0.3 kHz to 1 kHz, an average sound pressure level of about 74.6 dB in 1 kHz to 4 kHz, an average sound pressure level of about 89.4 dB in 4 kHz to 8 kHz, and an average sound pressure level of about 96.1 dB in 8 kHz to 12 kHz. Therefore, the vibration apparatus according to the aspect 6 of the present disclosure may have a sound pressure level characteristic of 59.5 dB or more in 0.3 kHz to 12 kHz.

A vibration apparatus according to the aspect 7 of the present disclosure has an average sound pressure level of about 73.0 dB in 0.3 kHz to 1 kHz, an average sound pressure level of about 85.4 dB in 1 kHz to 4 kHz, an average sound pressure level of about 95.3 dB in 4 kHz to 8 kHz, and an average sound pressure level of about 102.3 dB in 8 kHz to 12 kHz. Therefore, the vibration apparatus according to the aspect 7 of the present disclosure may have a sound pressure level characteristic of 73.0 dB or more in 0.3 kHz to 12 kHz. Therefore, the vibration apparatus according to the aspect 1 of the present disclosure has a sound pressure level characteristic of 88.4 dB or more in 0.3 kHz to 12 kHz. Accordingly, it may be seen that the aspect 7 of the present disclosure has a sound pressure level characteristic which is higher than the aspect 6.

In an apparatus according to one or more aspects of the present disclosure, in a case where a vibration apparatus is provided as an integration type without an adhesive member, a thickness of the vibration apparatus may be reduced, and a sound pressure level characteristic of the vibration apparatus may be more enhanced. Also, in an aspect of the present disclosure because a thickness of the vibration apparatus decreases, a weight of the vibration apparatus may be reduced, and thus, a lightweight vibration apparatus may be implemented.

A vibration apparatus and an apparatus including the same according to the present disclosure will be described below.

According to some aspects of the present disclosure, a vibration apparatus may comprise a vibration member, a cover member, and a vibration generating part between the vibration member and the cover member. At least a portion of the vibration generating part may be configured to be one body with or directly connected with the vibration member.

According to some aspects of the present disclosure, the at least a portion of the vibration generating part may be accommodated into the vibration member.

According to some aspects of the present disclosure, the vibration generating part may comprise a vibration layer including a piezoelectric material, a first electrode layer at a first surface of the vibration layer, and second electrode layer at a second surface of the vibration layer different from the first surface.

According to some aspects of the present disclosure, the vibration member may surround the second electrode layer.

According to some aspects of the present disclosure, the vibration member may surround the second electrode layer and may surround at least a portion of a lateral surface of the vibration layer.

According to some aspects of the present disclosure, the vibration member may comprise a material having an orientation.

According to some aspects of the present disclosure, the vibration member may comprise fiber reinforced plastic.

According to some embodiments of the present disclosure, at least a surface of the vibration member opposite to the vibration generating part may have adhesive properties.

According to some aspects of the present disclosure, the vibration member may have a Young's modulus within a range of 50 GPa to 200 GPa.

According to some aspects of the present disclosure, the vibration apparatus may further comprise a signal cable electrically connected with the vibration generating portion. The signal cable may comprise a first signal line electrically connected with the second electrode layer, and a second signal line electrically connected with the first electrode layer.

According to some aspects of the present disclosure, a portion of the signal cable may be accommodated between the vibration member and the cover member.

According to some aspects of the present disclosure, the vibration apparatus may further comprise an adhesive layer between the first electrode layer and the cover member.

According to some aspects of the present disclosure, the vibration member may comprise a plurality of vibration plates. Each of the plurality of vibration plates may comprise a filler. The fillers of the plurality of vibration plates may have different orientations.

According to some aspects of the present disclosure, the vibration member may comprise a first vibration plate, a second vibration plate on the first vibration plate, and a third vibration plate on the second vibration plate. Each of the first vibration plate, the second vibration plate, and the third vibration plate may comprise a filler having an orientation.

According to some aspects of the present disclosure, the fillers of the first vibration plate and the third vibration plate may have the same orientation.

According to some aspects of the present disclosure, the filler of the second vibration plate may have an orientation which differs from orientations of the fillers of each of the first vibration plate and the third vibration plate.

According to some aspects of the present disclosure, the filler of the second vibration plate may have an orientation which is aligned vertical to orientations of the fillers of each of the first vibration plate and the third vibration plate.

According to some aspects of the present disclosure, the vibration member may comprise a plurality of first vibration portions, and a second vibration portion provided between adjacent first vibration portions of the plurality of first vibration portions in parallel with the plurality of first vibration portions. The plurality of first vibration portions and the second vibration portion may have different orientations.

According to some aspects of the present disclosure, the vibration member may comprise a third vibration portion where an accommodating portion is provided therein, and a fourth vibration portion accommodated into the accommodating portion of the third vibration portion. The plurality of third vibration portions and the fourth vibration portion may have different orientations.

According to some embodiments of the present disclosure, the vibration member comprises carbon fibers, and a volume of the carbon fiber of each of the plurality of the first vibration portions and a volume of the carbon fiber of the second vibration portion are differently adjusted.

According to some aspects of the present disclosure, each of the first vibration plate, the second vibration plate, and the third vibration plate may comprise a plurality of first vibration portions, and a second vibration portion provided between adjacent first vibration portions of the plurality of first vibration portions in parallel with the plurality of first vibration portions.

According to some aspects of the present disclosure, the plurality of first vibration portions of the first vibration plate and the plurality of first vibration portions of the second vibration plate corresponding to the plurality of first vibration portions of the first vibration plate may have different orientations. The plurality of second vibration portions of the first vibration plate and the plurality of second vibration portions of the second vibration plate corresponding to the plurality of second vibration portions of the first vibration plate may have different orientations.

According to some aspects of the present disclosure, the plurality of first vibration portions of the first vibration plate and the plurality of first vibration portions of the third vibration plate corresponding to the plurality of first vibration portions of the first vibration plate may have the same orientation. The plurality of second vibration portions of the first vibration plate and the plurality of second vibration portions of the third vibration plate corresponding to the plurality of second vibration portions of the first vibration plate may have the same orientation.

According to some aspects of the present disclosure, the vibration member may comprise a plurality of vibration portions arranged in parallel. The plurality of vibration portions may have different orientations.

According to some aspects of the present disclosure, an apparatus may comprise a passive vibration member, and a vibration generating apparatus connected with the passive vibration member to vibrate the passive vibration member. The vibration generating apparatus may comprise the vibration apparatus. The vibration apparatus comprises a vibration member, a cover member, and a vibration generating part between the vibration member and the cover member. The vibration generating part may be directly connected with the vibration member.

According to some aspects of the present disclosure, the apparatus may further comprise an enclosure disposed at a rear surface of the passive vibration member.

According to some aspects of the present disclosure, the enclosure may comprise a plastic material and a filler, and the plastic material comprises fiber reinforced plastic.

According to some aspects of the present disclosure, the passive vibration member may comprise one or more materials of metal, plastic, paper, fiber, cloth, leather, wood, rubber, glass, and carbon. Or the passive vibration member may comprise one or more of a display panel including a pixel configured to display an image, a screen panel on which an image is to be projected from a display apparatus, a light emitting diode illumination panel, an organic light emitting illumination panel, an inorganic light emitting illumination panel, a signage panel, a vehicular interior material, a vehicular exterior material, a vehicular glass window, an interior material of a vehicular seat, a ceiling material of a building, an interior material of a building, a window of a building, an interior material of an aircraft, a window of an aircraft, an interior material of a car, a window of a car, and a mirror.

According to some embodiments of the present disclosure, the apparatus may further comprise a connection member connected between a center portion of the vibration generating apparatus and the passive vibration member.

It will be apparent to those skilled in the art that various modifications and variations may be made in the present disclosure without departing from the scope of the disclosures. Thus, it is intended that the present disclosure covers the modifications and variations of this disclosure provided that within the scope of the appended claims and their equivalents.

What is claimed is:

1. A vibration apparatus, comprising:
a vibration member;
a cover member; and
a vibration generating part disposed between the vibration member and the cover member, the vibration generating part comprising:
a vibration layer including a piezoelectric material;
a first electrode layer disposed at a first surface of the vibration layer; and
a second electrode layer disposed at a second surface of the vibration layer different from the first surface,
wherein at least a portion of the vibration generating part is configured to be one body with or directly connected with the vibration member,
wherein the vibration member comprises fiber reinforced plastic having an orientation defined by a filler included in the fiber reinforced plastic, and
wherein the vibration member directly contacts the second electrode layer without an adhesive layer therebetween, and the vibration member surrounds a lateral surface of the vibration layer.

2. The vibration apparatus of claim 1, wherein the vibration member surrounds the second electrode layer.

3. The vibration apparatus of claim 1, wherein the vibration member surrounds the second electrode layer.

4. The vibration apparatus of claim 1, wherein the vibration member comprises a material having an orientation.

5. The vibration apparatus of claim 1, wherein at least a surface of the vibration member opposite to the vibration generating part has adhesive properties.

6. The vibration apparatus of claim 1, wherein the vibration member has a Young's modulus within a range of 50 GPa to 200 GPa.

7. The vibration apparatus of claim 1, further comprising a signal cable electrically connected with the vibration generating part,
wherein the signal cable comprises:
a first signal line electrically connected with the second electrode layer; and
a second signal line electrically connected with the first electrode layer.

8. The vibration apparatus of claim 7, wherein a portion of the signal cable is accommodated between the vibration member and the cover member.

9. The vibration apparatus of claim 1, further comprising an adhesive layer disposed between the first electrode layer and the cover member.

10. The vibration apparatus of claim 1, wherein the vibration member comprises a plurality of vibration plates,
wherein each of the plurality of vibration plates comprises the filler, and
wherein the fillers of the plurality of vibration plates have different orientations.

11. The vibration apparatus of claim 1, wherein the vibration member comprises:
a first vibration plate;
a second vibration plate disposed on the first vibration plate; and
a third vibration plate disposed on the second vibration plate, and
wherein each of the first vibration plate, the second vibration plate, and the third vibration plate comprises the filler having an orientation.

12. The vibration apparatus of claim 11, wherein the fillers of the first vibration plate and the third vibration plate has a same orientation.

13. The vibration apparatus of claim 11, wherein the filler of the second vibration plate has an orientation which differs from orientations of the fillers of each of the first vibration plate and the third vibration plate.

14. The vibration apparatus of claim 11, wherein the filler of the second vibration plate has an orientation which is aligned vertical to orientations of the fillers of each of the first vibration plate and the third vibration plate.

15. The vibration apparatus of claim 11, wherein each of the first vibration plate, the second vibration plate, and the third vibration plate comprises:
a plurality of first vibration portions; and
a second vibration portion provided between adjacent first vibration portions of the plurality of first vibration portions in parallel with the plurality of first vibration portions.

16. The vibration apparatus of claim 15, wherein the plurality of first vibration portions of the first vibration plate and the plurality of first vibration portions of the second vibration plate corresponding to the plurality of first vibration portions of the first vibration plate have different orientations, and wherein the plurality of second vibration portions of the first vibration plate and the plurality of second vibration portions of the second vibration plate corresponding to the plurality of second vibration portions of the first vibration plate have different orientations.

17. The vibration apparatus of claim 15, wherein the plurality of first vibration portions of the first vibration plate and the plurality of first vibration portions of the third vibration plate corresponding to the plurality of first vibration portions of the first vibration plate have the same orientation, and wherein the plurality of second vibration portions of the first vibration plate and the plurality of second vibration portions of the third vibration plate corresponding to the plurality of second vibration portions of the first vibration plate have the same orientation.

18. The vibration apparatus of claim 1, wherein the vibration member comprises:

a plurality of first vibration portions; and a second vibration portion provided between adjacent first vibration portions of the plurality of first vibration portions in parallel with the plurality of first vibration portions, and wherein the plurality of first vibration portions and the second vibration portion have different orientations.

19. The vibration apparatus of claim 18, wherein the vibration member comprises carbon fibers, and wherein a volume of the carbon fiber of each of the plurality of the first vibration portions and a volume of the carbon fiber of the second vibration portion are differently adjusted.

20. The vibration apparatus of claim 1, wherein the vibration member comprises:

a third vibration portion where an accommodating portion is provided therein; and a fourth vibration portion accommodated into the accommodating portion of the third vibration portion, and wherein the plurality of third vibration portions and the fourth vibration portion have different orientations.

21. The vibration apparatus of claim 1, wherein the vibration member comprises a plurality of vibration portions arranged in parallel, and wherein the plurality of vibration portions have different orientations.

22. An apparatus, comprising:

a passive vibration member; and a vibration generating apparatus connected with the passive vibration member to vibrate the passive vibration member, wherein the vibration generating apparatus comprises the vibration apparatus of claim 1.

23. The apparatus of claim 22, further comprising an enclosure disposed at a rear surface of the passive vibration member.

24. The apparatus of claim 23, wherein the enclosure comprises a plastic material and a filler, and the plastic material comprises fiber reinforced plastic.

25. The apparatus of claim 23, wherein the passive vibration member comprises one or more materials of metal, plastic, paper, fiber, cloth, leather, wood, rubber, glass, and carbon, or wherein the passive vibration member comprises one or more of a display panel including a pixel configured to display an image, a screen panel on which an image is to be projected from a display apparatus, a light emitting diode illumination panel, an organic light emitting illumination panel, an inorganic light emitting illumination panel, a signage panel, a vehicular interior material, a vehicular exterior material, a vehicular glass window, an interior material of a vehicular seat, a ceiling material of a building, an interior material of a building, a window of a building, an interior material of an aircraft, a window of an aircraft, an interior material of a car, a window of a car, and a mirror.

26. The apparatus of claim 22, further comprising a connection member connected between a center portion of the vibration generating apparatus and the passive vibration member.

27. A vibration apparatus, comprising:

a vibration member comprising a plurality of vibration plates laminated together, each vibration plate comprising a fiber-reinforced plastic with a filler having a directional fiber orientation;

a cover member; and a vibration generating part disposed between the vibration member and the cover member, the vibration generating part comprising:

a vibration layer including a piezoelectric material;

a first electrode layer disposed at a first surface of the vibration layer; and a second electrode layer disposed at a second surface of the vibration layer different from the first surface, wherein the vibration member directly contacts the second electrode layer without an adhesive layer therebetween, and the vibration member surrounds at least a portion of a lateral surface of the vibration layer, wherein at least a portion of the vibration generating part is configured to be one body with or directly connected with the vibration member, and wherein at least two of the vibration plates have different fiber orientations, the filler being structural stiffness-defining fibers of the fiber-reinforced plastic vibration plates.

* * * * *